(12) United States Patent
Sypeck et al.

(10) Patent No.: US 8,247,333 B2
(45) Date of Patent: Aug. 21, 2012

(54) MULTIFUNCTIONAL PERIODIC CELLULAR SOLIDS AND THE METHOD OF MAKING THEREOF

(75) Inventors: David J. Sypeck, Daytona Beach Shores, FL (US); Haydn N. G. Wadley, Keswick, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 1199 days.

(21) Appl. No.: 10/296,728

(22) PCT Filed: May 29, 2001

(86) PCT No.: PCT/US01/17363
§ 371 (c)(1),
(2), (4) Date: Nov. 25, 2002

(87) PCT Pub. No.: WO01/92001
PCT Pub. Date: Dec. 6, 2001

(65) Prior Publication Data
US 2008/0226870 A1    Sep. 18, 2008

Related U.S. Application Data

(60) Provisional application No. 60/207,151, filed on May 26, 2000, provisional application No. 60/275,422, filed on Mar. 13, 2001.

(51) Int. Cl.
*B32B 5/26* (2006.01)
(52) U.S. Cl. .......... 442/32; 442/2; 442/6; 442/203; 442/228; 442/229; 442/238; 442/239; 442/246; 442/316; 442/318; 442/376; 442/381; 156/60
(58) Field of Classification Search .......... 442/2, 6, 442/32, 76, 203, 228, 229, 238, 239, 246, 442/316, 318, 376, 381; 156/60
See application file for complete search history.

(56) References Cited

U.S. PATENT DOCUMENTS

| | | | |
|---|---|---|---|
| 2,288,104 A | 6/1942 | Pasquier | |
| 2,789,076 A * | 4/1957 | Frieder et. al. ................ | 428/86 |

(Continued)

OTHER PUBLICATIONS

Dictionary definition of "face", The American Heritage® Dictionary of the English Language, Fourth Edition Copyright © 2004, 2000 by Houghton Mifflin Company. (no month).*

(Continued)

*Primary Examiner* — Andrew Piziali
(74) *Attorney, Agent, or Firm* — Novak Druce DeLuca + LLP; Robert J. Decker

(57) ABSTRACT

A cellular material that can provide a unique combination of properties and characteristics for a variety of applications requiring a cellular solid that possesses one or more of the following characteristics: (1) efficient load support in one or more directions, (2) excellent mechanical impact energy absorption and vibration suppression potential, (3) high convection heat transfer throughout, (4) low pumping requirements for fluid throughput, for example in a second direction orthogonal to one or more load-bearing directions, (5) a substantially linear dependence of the Young's and shear moduli along with the tensile, compressive and shear yield strengths upon relative density (6) a potentially inexpensive textile-based synthetic approach, (7) excellent filtration potential, (8) a high surface area to volume ratio for enhanced activity as a catalyst or catalyst support (9) interconnected, open porosity for device storage, biological tissue in-growth or other functionalities requiring open space, and (10) extendibility to a wide variety of materials.

29 Claims, 29 Drawing Sheets

U.S. PATENT DOCUMENTS

| | | | |
|---|---|---|---|
| 3,783,969 A | 1/1974 | Pall | |
| 3,795,288 A | 3/1974 | Pall | |
| 3,857,217 A | 12/1974 | Reps | |
| 3,971,072 A * | 7/1976 | Armellino | 2/2.5 |
| 3,996,082 A | 12/1976 | Leatherman | |
| 4,001,478 A | 1/1977 | King | |
| 4,019,540 A | 4/1977 | Holman | |
| 4,037,751 A | 7/1977 | Miller | |
| 4,038,440 A | 7/1977 | King | |
| 4,130,233 A | 12/1978 | Chisholm | |
| 4,223,053 A | 9/1980 | Brogan | |
| 4,291,732 A | 9/1981 | Artzer | |
| 4,450,338 A | 5/1984 | Conn | |
| 4,531,511 A | 7/1985 | Hochberg | |
| 4,625,710 A | 12/1986 | Harada | |
| 4,632,716 A | 12/1986 | Smith | |
| 4,639,388 A | 1/1987 | Ainsworth | |
| 4,756,943 A | 7/1988 | Koletzko | |
| 4,859,541 A | 8/1989 | Maxeiner | |
| 4,923,544 A | 5/1990 | Weisse | |
| 5,070,673 A | 12/1991 | Weisse | |
| 5,102,723 A | 4/1992 | Pepin | |
| 5,137,058 A | 8/1992 | Anahara | |
| 5,176,949 A * | 1/1993 | Allagnat et al. | 428/198 |
| 5,181,549 A | 1/1993 | Shapovalov | |
| 5,217,770 A | 6/1993 | Morris | |
| 5,224,519 A | 7/1993 | Farley | |
| 5,266,279 A * | 11/1993 | Haerle | 422/177 |
| 5,312,660 A | 5/1994 | Morris | |
| 5,360,500 A | 11/1994 | Evans | |
| 5,424,139 A | 6/1995 | Shuler | |
| 5,465,760 A | 11/1995 | Mohamed | |
| 5,471,905 A | 12/1995 | Martin | |
| 5,472,769 A * | 12/1995 | Goerz et al. | 428/138 |
| 5,503,887 A | 4/1996 | Diaz | |
| 5,527,590 A | 6/1996 | Priluck | |
| 554,773 A | 8/1996 | Evans | |
| 5,605,628 A | 2/1997 | Davidson | |
| 5,624,622 A | 4/1997 | Boyce | |
| 5,654,518 A | 8/1997 | Dobbs | |
| 5,677,029 A * | 10/1997 | Prevorsek et al. | 428/113 |
| 5,679,467 A | 10/1997 | Priluck | |
| 5,698,282 A | 12/1997 | DeMeyer | |
| 574,157 A | 4/1998 | Boyce | |
| 577,282 A | 6/1998 | Yasui | |
| 5,771,488 A * | 6/1998 | Honkala | 2/2.5 |
| 5,817,391 A | 10/1998 | Rock | |
| 5,888,609 A * | 3/1999 | Karttunen et al. | 428/107 |
| 5,888,912 A | 3/1999 | Piemonte | |
| 5,924,459 A | 7/1999 | Evans | |
| 5,962,150 A | 10/1999 | Priluck | |
| 5,972,146 A | 10/1999 | Fantino | |
| 6,076,324 A | 6/2000 | Daily | |
| 6,080,495 A | 6/2000 | Wright | |
| 6,170,560 B1 | 1/2001 | Daily | |
| 6,176,964 B1 | 1/2001 | Parente | |
| 618,928 A1 | 2/2001 | Seible | |
| 620,066 A1 | 3/2001 | Figge | |
| 620,725 A1 | 3/2001 | Tashiro | |
| 6,284,346 B1 | 9/2001 | Sheridan | |
| 6,644,535 B2 | 11/2003 | Wallach et al. | |
| 6,739,104 B2 | 5/2004 | Tokonabe | |
| 2003/0049537 A1 | 3/2003 | Wadley | |

OTHER PUBLICATIONS

Dictionary definition of "sheet", The American Heritage® Dictionary of the English Language, Fourth Edition Copyright © 2004, 2000 by Houghton Mifflin Company. (no month).*

Queheillalt, "Electron beam—directed vapor deposition of multifunctional structures," Mat Res. Soc. Symp. Proc. vol. 672.

Sypeck, "Multifunctional microtruss laminates: Textile synthesis and properties," Mat. Res. Soc. Symp. Proc. vol. 672 2001 Materials Research Society.

Evans, "Lightweight materials and structures," MRS Bulletin Oct. 2001.

* cited by examiner

| Designation | Wire Diameter (mm) | Wire Spacing (mm) | Relative density |
|---|---|---|---|
| 1 (mesh/in) | 2.03 | 23.4 | 0.06 |
| 10 (mesh/in) | 0.635 | 1.91 | 0.20 |
| 100 (mesh/in) | 0.114 | 0.140 | 0.35 |
| Insect screening | 0.229 | 1.18 | 0.13 |
| High transparency | 0.0305 | 0.478 | 0.05 |

Numerous available alloys including those based upon:
Fe, Ni, Al, Cu, Ti, Ta, Ag, Pt, etc.

Knitting 605

Braiding 610

Quasi-triaxial Weave 630

| AXIS / DIMENSION | 0 NON-AXIAL | 1 MONO-AXIAL | 2 BIAXIAL | 3 TRIAXAIL | 4~ MULTI-AXAIL |
|---|---|---|---|---|---|
| 1D | | ROVING-YARN | | | |
| 2D | CHOPPED STRAND MAT | PREIMPREG-NATION SHEET | PLANE WEAVE 625 | TRIAXIAL WEAVE 615 | MULTI-AXIAL WEAVE, KNIT |
| 3D LINEAR ELEMENT | | 3-D BRAID 635 | MULTI-PLY WEAVE 640 | TRIAXIAL 3-D WEAVE 645 | (MULTI-AXIAL 3-D WEAVE) 4)~n, 12)~14) 650 |
| 3D PLANE ELEMENT | | LAMINATE TYPE | H or I BEAM 655 | HONEY-COMB TYPE 660 | |

FIG. 6E

Alloy 304 (Fe-18Cr-8Ni)
Transient liquid phase: Ni-25Cr-10P
Core relative density: 0.04
Facesheet thickness: 0.61 mm Alloy 110 (Cu)
Transient liquid phase: Ni-25Cr-10P
Core relative density: 0.20
Facesheet thickness: 3.81 mm 110 copper (braze: Ni-25Cr-10P)

304 stainless steel (braze: Ni-25Cr-10P)

titanium (braze: Ag-9Ga-9Pd)

nichrome (braze: Ni-25Cr-10P)

MULTIFUNCTIONAL PERIODIC CELLULAR SOLIDS AND THE METHOD OF MAKING THEREOF

RELATED APPLICATIONS

This application claims priority from U.S. Provisional Application Ser. No. 60/207,151 filed on May 26, 2000, entitled "Cellular Filamentary Structures and Method of Manufacture" and U.S. Provisional Application Ser. No. 60/275,422 filed on Mar. 13, 2001, entitled "Multifunctional Microtruss Laminates: Textile Synthesis and Properties," the entire disclosures of which are hereby incorporated by reference herein.

GOVERNMENT SUPPORT

Work described herein was supported by Federal Grant No. N00014-96-I-1028, awarded by DARPA/ONR. The United States Government has certain rights in the invention.

FIELD OF INVENTION

The present invention relates generally to improved structural/multifunctional material designs and methods for their manufacture. More particularly, the invention is directed to the use of textiles, and lamination techniques, or other means of joining arranged filaments and/or textile layers, to form periodic cellular solids.

BACKGROUND OF THE INVENTION

Cellular solids are made up of interconnected networks of intersecting support members or plates that form the edges and faces of cells. Two classes of cellular metal solids have been developed: stochastic solid foams and periodic lattice block or truss materials. Such materials can be useful, for example, as building materials, as thermal insulation, protective packaging, electromagnetic shielding, protective shielding, battery components, to provide buoyancy and many other applications. Cellular solids can be made from a variety of materials, including metals, ceramics, polymers, composites, and semiconductors, and can be designed to possess useful combinations of thermophysical, chemical and mechanical properties that can be tailored by adjusting the relative density, cellular architecture or material type of the cellular solid.

There is growing interest in using cellular materials for applications where more than one function is required. The search for lighter and stronger load bearing designs along with improvements in stiffness and strength-to-weight ratio has been a major focus in the field of material science for many years. Modem research in this area has primarily focused upon relatively uncommon metals such as beryllium and titanium alloys, or fiber-reinforced composites materials. The composites typically consist of fibers (or whiskers) made of glass, carbon, polymer, metal, or ceramic (e.g., boron, silicon carbide or aluminum oxide) surrounded by a matrix (e.g., aluminum alloy, epoxy). While the exotic metal alloys and composites can provide efficient load support, and can be designed to simultaneously provide good mechanical impact energy absorption, they are expensive to develop and synthesize. Furthermore, metal and composite materials suited for load support and energy absorption are not often designed to simultaneously provide a high rate of fluid flow and heat transfer amongst other functionalities.

The porosity within a cellular solid makes it particularly attractive for multifunctional applications. Several classes of cellular solids have been developed, including gasars, consolidated powder products, vapor deposited materials, hollow sphere structures, stochastic foams and lattice block or truss materials. The most common are stochastic in nature, made by variants of foaming in the liquid, solid or semi-solid state. For example, stochastic metal foams can be made from directional foaming, which produces cellular architectures that are predominantly closed cell, often with wide distributions of cell size and many imperfections. Closed cell stochastic structures are useful, for example, for sound attenuation, fire retardation and impact energy absorption. However, they do not provide for fluid throughput (i.e., transport).

Fluids do however, flow through open cell stochastic foams because of the interconnected nature of the porosity. Materials of this type can be made using reticulated polymer foam templates. In one approach, the template is used as a pattern for an investment casting mold, which is then filled with a liquid (e.g., molten metal) and solidified. In another approach, a vapor or fine metal powder slurry is deposited directly onto the template. In the later, a subsequent heat treatment removes the organic compounds and densifies the structure. Open cell stochastic metal foams are useful, for example, for lightweight heat exchangers or as electrodes in nickel metal hydride batteries.

However, both open and closed cell stochastic foams have a number of disadvantages that preclude their use for many multifunctional applications. For example, current foaming methods do not provide for good control over the distribution of material at the cell level, leading to unit cells of non-uniform dimensions. Because of the non-uniformity, such structures do not normally allow fluids to easily pass through them. Furthermore, certain properties of both open and closed cell materials made by foaming techniques vary nonlinearly with their relative density. One disadvantage to this is that it complicates prediction of the physical properties based on the material and structural design. For example, the Young's moduli and compressive yield strengths of open cell stochastic metal foams vary with relative density according to the following power law relations:

$$E/E_s = (\rho/\rho_s)^2 \text{ and} \tag{1}$$

$$\sigma_c/\sigma_{ys} = 0.3(\rho/\rho_s)^{3/2} \tag{2}$$

wherein E is the Young's modulus for the open cell stochastic metal foam, $E_s$ is the Young's modulus of its base material, $\sigma_c$ is the compressive yield strength of the foam, $\sigma_{ys}$ is the yield strength of its base material, p is the foam relative density, and $\rho_s$ is the density of the solid. The power law dependence on relative density indicates a rapid property loss with decreased density. It is a result of ligament bending. Stochastic metal foam structures do not generally provide a substantially linear dependence of the Young's moduli and compressive yield strength and exhibit low moduli and strength at low relative densities (e.g., $\rho/\rho_s$. at approximately 0.10)

Periodic metal truss structures have been made using polymer or wax truss patterns and investment casting. Recent work has used rapid prototyping and injection molding to create polymer or wax patterns with open cell lattice architectures followed by investment casting and heat treatment. These are known as lattice block or truss materials. Individual cells can be on the order of a few millimeters. By manipulating the truss architectures, the properties of the structure can be modified. For example, the Young's and shear moduli along with the tensile, compressive, and shear yield strengths of truss materials can vary with relative density in a substantially linear way when truss architecture is designed for tension or compression only with no bending (unlike open cell stochastic foam structures). This linear dependence is especially important at low relative density where properties far exceed those of stochastic foams.

By providing a substantially uniform and controllable distribution of material at the unit cell level, periodic truss structures can provide efficient load support in one or more directions, substantially isotropic and high convection heat transfer throughout the structure with low pumping requirements for fluid throughput in a direction, orthogonal to one or more load-bearing directions and excellent mechanical impact energy absorption amongst many other functionalities. However, the casting approaches used to manufacture miniature trusses are expensive and the resulting structures are subject to knockdown by casting factors (e.g., entrapped porosity, shrinkage residual stress, etc.). Furthermore, many materials of the conventional art are difficult to cast and do not favorably respond to post-processing (e.g. heat treatment).

Hence, there remains a long-felt need in the art for a multifunctional cellular solid that is characterized by the low production costs of stochastic foam structures, yet possesses the superior properties and multifunctional characteristics found in many periodic truss structures produced by investment casting. Accordingly, the present invention provides an inexpensive cellular material that can provide a unique and superior combination of properties and characteristics that overcome many of the disadvantages of the prior art. Specifically, the advantages of the present invention over the prior art include, inter alia, providing a cellular solid that possesses one or more, preferably all, of the following characteristics: (1) efficient support in one or more directions, (2) excellent mechanical impact energy absorption and vibration suppression potential (3) high heat transfer throughout, (4) low pumping requirements for fluid throughput, for example in a second direction orthogonal to one or more load-bearing directions, (5) substantially linear dependence of the Young's and shear moduli along with the tensile, compressive and shear yield strengths upon relative density and (6) a potentially inexpensive textile-based synthetic approach, (7) extendibility to any metal, ceramic, polymer, semiconductor or other material that can be woven, (8) excellent filtration potential, (9) a high surface area to volume ratio for enhanced activity as a catalyst or catalyst support, and (10) interconnected, open porosity for device storage, biological tissue in-growth or other functionalities requiring open space. Thus the teachings of the present invention overcome the limitations of the prior art by providing a multifunctional material that has a unique combination of advantages. The conventional art does not teach, provide, or suggest all of the important advantages of a multifunctional periodic cellular solid of the instant invention, as further discussed below.

SUMMARY OF THE INVENTION

The present invention uses either (1) two or more joined textile layers or (2) one or more textile layers with (or without) one or more rigid or semi-flexible face sheets to achieve a periodic cellular solid. By practicing the disclosed invention, the skilled practitioner can now make and use multifunctional cellular solid materials.

In one aspect, the present invention features a cellular structure comprising: a first textile layer comprising a first array of intersecting first structural support members of first pre-determined dimensions, wherein the intersecting support members form apertures of predetermined geometric configurations. The first textile layer having a top side and a bottom side, wherein at least a portion (or all) of the top side of the first textile layer comprise a first adjoining region; a second textile layer comprising a second array of intersecting second structural support members of second pre-determined dimensions, wherein the intersecting support members form apertures of predetermined geometric configurations. The second planar textile layer having a top side and a bottom side, wherein at least a portion (or all) of the bottom side of the second textile layer comprise a second adjoining region; wherein the first adjoining region is contiguously disposed with respect to the second adjoining region; wherein a plurality of the first structural support members of the first adjoining region are discretely bonded to a plurality of the second structural support members of the second adjoining region; and wherein the first structural support members of the first adjoining region are characterized by a perpendicular fluid flow effective degree of vertical alignment with respect to the second structural support members of the second adjoining region. The first structural support members of the first adjoining region are, for example, aligned in peak-to-peak vertical alignment with respect to the second structural support members of the second adjoining region. In other embodiments, the adjacent structural support members are aligned peak-to-trough (i.e., valley) vertical alignment, or some degree thereof In an all-inclusive manner, the cellular structure comprises: N number (N>1) of vertically stacked textile layers, wherein each of said stacked textile layers comprise: an array of intersecting structural support members forming apertures of predetermined geometric configurations, wherein each of said predetermined geometric apertures are vertically aligned (to a predetermined range) with respective apertures of corresponding immediate adjacent said textile layers, the textile layers having a top side and a bottom side, as well as having a perimeter with at least three perimeter sides. At least a portion or all of the top side of each of the textile layers for the ($i^{th}$) through ($N^{th}-1$) layers comprise a top adjoining region (where i=1, 2, 3, ... N). At least a portion or all of the bottom side of each of said textile layers for the ($i^{th}+1$) through ($N^{th}$) layers comprise a bottom adjoining region. Each of the textile layers are discretely bonded to immediate adjacent said textile layers, wherein the discrete bonds are formed between the said bottom adjoining region and top adjoining region. It should be noted that in some embodiments the cellular structure may comprise of only one layer (2-D or 3-D) and therefore N=1.

In some embodiments, the cellular structure further comprises a perimeter-oriented face sheet having an inner surface and an outer surface, wherein the inner surface is fixedly bonded to one of the perimeter sides of at least a minority of the textile layers. Similarly, the cellular structure further comprises a second perimeter-oriented face sheet having an inner surface and an outer surface, wherein the inner surface is fixedly bonded to a second one of said perimeter sides of at least a minority of the textile layers.

In other embodiments, the cellular structure further comprises a layer-oriented face sheet having an inner surface and an outer surface, wherein the inner surface is fixedly bonded to the bottom side of first the textile layer. Similarly, the cellular structure further comprises a second layer-oriented face sheet having an inner surface and an outer surface, wherein the inner surface is fixedly bonded to said top side of Nth said textile layer.

In some embodiments, the first planar textile layer and the second textile layer are, woven, knitted, woven wire, filament, tow or other fibrous mesh, including tubular (hollow or solid) and wire filaments of any cross-sectional shape (e.g. circular, oval, square, rectangular, polygonal, hexagonal, etc.). The structural support members of the textile layers can form a woven mesh, knitted mesh, braided mesh, triaxial, quasi-triaxial, pre-crimped quasi-triaxial, and biaxial. The structural support members may also be three-dimensional, including but not limited to braided, multi-ply, triaxial, multi-axial, 'H' or T beam, or honeycomb. Moreover, in an alternative embodiment, the layers may be defined by cloth tows containing many filaments that are woven into a cloth, for example fiberglass cloth tows.

Still yet in some embodiments, the textile types of the structural support members include plane, tri-axial, multi-axial and multi-ply. All known variations of two-dimensional (2-D) and three-dimensional (3-D) textiles are included as well.

In another embodiment, the invention provides a method for producing a cellular structure comprising the steps of: (1) providing a first planar textile layer, wherein the first planar textile layer comprises a first array of intersecting first structural support members of first pre-determined dimensions, wherein the intersecting support members form apertures of predetermined geometric configurations, wherein the first planar textile layer includes a top side and a bottom side, wherein a portion or all of the top side comprises a first adjoining region; (2) providing a second planar textile layer, wherein the second planar textile layer comprises a second array of intersecting second structural support members of second pre-determined dimensions, wherein the intersecting support members form apertures of predetermined geometric configurations, wherein the second planar textile layer includes a top side and a bottom side, wherein a portion or all of the bottom side comprises a second adjoining region; (3) aligning the first structural support members of the first adjoining region with respect to the second structural support members of the second adjoining region so as to achieve a perpendicular-fluid-flow-effective degree of vertical alignment (to a predetermined range) between the first structural support members of the first adjoining region with respect to the second structural support members of the second adjoining region; (4) contacting the first structural support members of the first adjoining region with respect to the second structural support members of the second adjoining region; and (5) discretely joining some or all of the first structural support members of the first adjoining region with respect to some or all of the second structural support members of the second adjoining region.

In an all-inclusive manner, the present invention method comprises: providing N number (N>1) of textile layers, wherein each of said textile layers comprise: an array of intersecting structural support members forming apertures of pre-determined geometric configurations, wherein the textile layers have a top side and a bottom side and have a perimeter with at least three perimeter sides; aligning the textile layers wherein each the predetermined geometric apertures are vertically aligned (to desired degree) with respective apertures of corresponding immediate adjacent the textile layers, wherein at least one portion or all of the top side of each of the textile layers for the ($i^{th}$) through ($N^{th}$−1) layers comprise a top adjoining region, wherein at least portions or all of the bottom side of each of the textile layers for the($i^{th}$+1) through ($N^{th}$) layers comprise a bottom adjoining region; contacting each of the textile layers with immediate adjacent textile layers at some or all of the respective top adjoining region and bottom adjoining region; and joining some or all of the contacted textile layers by forming a bond at some or all of the areas of contact.

In some embodiments, the method of making the cellular structure further comprises: providing a perimeter-oriented face sheet having an inner surface and an outer surface; and bonding the inner surface of the face sheet to one of the perimeter sides of at least a minority of the textile layers. Similarly, the method further comprises: providing a second perimeter-oriented face sheet having an inner surface and an outer surface; and bonding said inner surface of said second face sheet to a second one of said perimeter sides of at least a minority of said textile layers.

In other embodiments, the method of making the cellular structure further comprises: providing a layer-oriented face sheet having an inner surface and an outer surface; and bonding portions of the inner surface of the face sheet to portions or all of the bottom side of the first textile layer. Similarly, the method further comprises: providing a second layer-oriented face sheet having an inner surface and an outer surface; and bonding portions of the inner surface of said second face sheet to portions or all of the top side of $N^{th}$ the textile layer.

The first structural support members of the first adjoining region are aligned in peak-to-peak vertical alignment with respect to the second structural support members of the second adjoining region, wherein the openings/apertures of the first adjoining region are substantially vertically aligned with the openings/apertures of the second adjoining region. In other embodiments, the peaks are vertically aligned with the valleys/troughs of adjacent layers, or are randomly arranged. In some embodiments, the first structural support members of the first adjoining region with respect to the second structural support members of the second adjoining region are discretely joined and fixed, for example, using a transient liquid phase or by solid state (e.g., diffusion) bonding or by using solvents to promote fiber-fiber bonding.

In short, the invention provides the art with a heretofore unappreciated cellular material that can provide a unique combination of properties and characteristics for a variety of applications requiring a cellular solid that possesses one or more of the following characteristics: (1) efficient load support in one or more directions, (2) excellent mechanical impact energy absorption and vibration suppression potential, (3) high convection heat transfer throughout, (4) low pumping requirements for fluid throughput, for example in a second direction orthogonal to one or more load-bearing directions, (5) a substantially linear dependence of the Young's and shear moduli along with the tensile, compressive and shear yield strengths upon relative density (6) a potentially inexpensive textile-based synthetic approach, (7) excellent filtration potential, (8) a high surface area to volume ratio for enhanced activity as a catalyst or catalyst support (9) interconnected, open porosity for device storage, biological tissue in-growth or other functionalities requiring open space, and (10) extendibility to a wide variety of materials.

Preferred embodiments relate to cellular materials with two or more of these characteristics and particularly preferred embodiments relate to cellular materials with all ten of the above listed characteristics. Particularly preferred properties of the cellular materials of the invention include cellular materials that are structurally efficient, absorb large amounts of mechanical energy and show good potential for efficient heat exchange, and materials that can be produced according to the methods of the invention for an acceptably low cost.

These and other objects, along with advantages and features of the invention disclosed herein, will be made more apparent from the description, drawings and claims that follow.

BRIEF DESCRIPTION OF THE DRAWINGS

The foregoing and other objects, features and advantages of the present invention, as well as the invention itself, will be more fully understood from the following description of preferred embodiments, when read together with the accompanying drawings, in which:

FIGS. 6A-6E show a schematic representation of some non-limiting examples of cellular structures.

DETAILED DESCRIPTION OF THE INVENTION

Figure 1A:
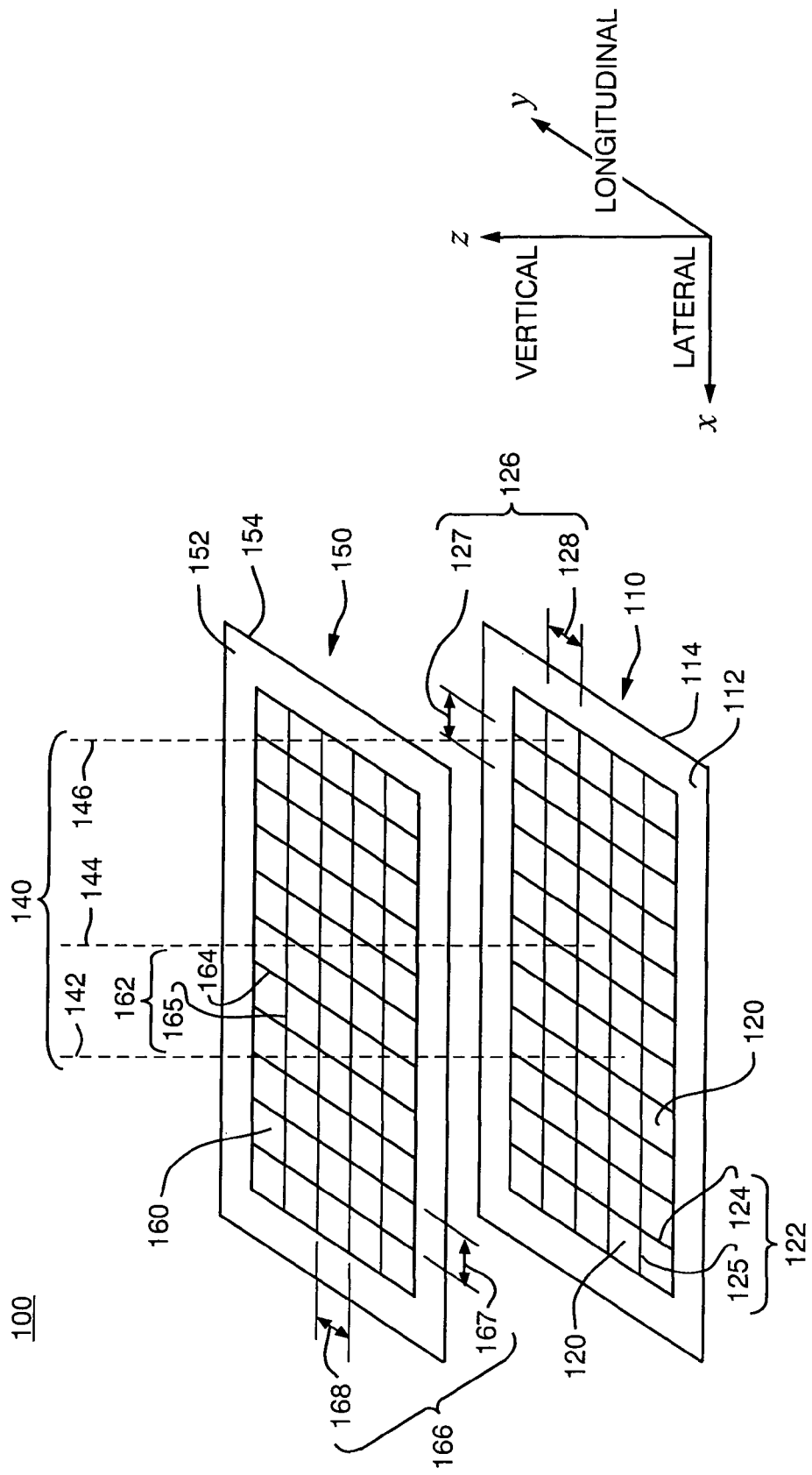
FIGS. 1A-1B show a schematic representation of the components of a cellular structure that can be contiguously bonded together in accordance with some embodiments of the invention.

In order to more clearly and concisely describe the subject matter of the claims, the following definitions are intended to provide guidance as to the meaning of specific terms used in the following written description, examples and appended claims. As used herein, the terms listed below shall be accorded the following meanings unless otherwise indicated:

Adjoin means to be next to or contiguous with.

Adjoining means touching at some point or along a line; contiguous.

Cellular structure means a framework with a plurality of unit cells.

Contiguous means touching along some or all of one side.

Corrugated means shaped in parallel grooves and ridges.

Discrete means separate and distinct, not attached to others, unrelated; made up on distinct parts, discontinuous.

Disposed means arranged in a particular order.

Fluid means a gas or liquid or particulate solid capable of movement or combination thereof. The definition of fluid includes, but is not limited to, condensing or boiling liquids, viscous liquids, steam, particulate solids, powders, or any medium capable of movement through a cellular solid when exposed to directed pressure.

Fluid flow means the movement of a fluid.

Laminate means a structure made by building up two or more layers.

Pre-determined dimensions means that the dimensions are substantially fixed prior to assembly of a structure, and are two-dimensional or three-dimensional.

Pre-determined geometric configurations means the dimensions that are two-dimensional or three-dimensional and are substantially fixed prior to assembly of a structure.

Textile means a material comprising structural support members, which can be, for example, a woven, braided or knitted material.

Selected Structural Embodiments

In its broadest aspects, the present invention provides textile based cellular structures and methods for producing such structures. The structures of the invention can comprise one or more textile layers and one or more rigid (or semi-rigid) face sheets in a laminate configuration. The textile layer can be made of any suitable material including but not limited to woven, braided or knitted wires, filaments or tubes, and a textile layer can be substantially planar, bent, curvilinear or corrugated, as well as rigid and flexible, and in a variety of arrangements (dutch weave, hexagonal mesh, 3-D weave or braid, crimped mesh, etc.). Other textile types include plane, tri-axial, multi-axial and multi-ply. All known variations of 2-D and 3-D textiles are also included. Filament types include tubular and wire filaments of constant and/or non-constant cross section.

The face sheet is preferably made from a suitable rigid material, preferably material that can be bonded to one or more of the textile layers. In accordance with the invention, some non-limiting examples of particularly preferred configurations of textile layers and face sheets include individually or combination thereof: (1) a plurality of textile layers bonded together to generate a cellular solid with a repeating unit cell, (2) a plurality of textile layers bonded together to generate a cellular solid with a repeating unit cell, with one or more structural panels attached along at least one face of a textile layer (i.e. layer oriented) and/or with one or more structural panels attached to an end(s) of the cellular solid (i.e., perimeter-oriented), and (3) a structural panel comprising a corrugated textile layer contiguously bonded to a single face sheet or to two face sheets in a sandwich configuration. Guidance provided herein facilitates the design, construction, make and use of the cellular structures of the invention, as well as the best mode for the invention.

Figure 1B:
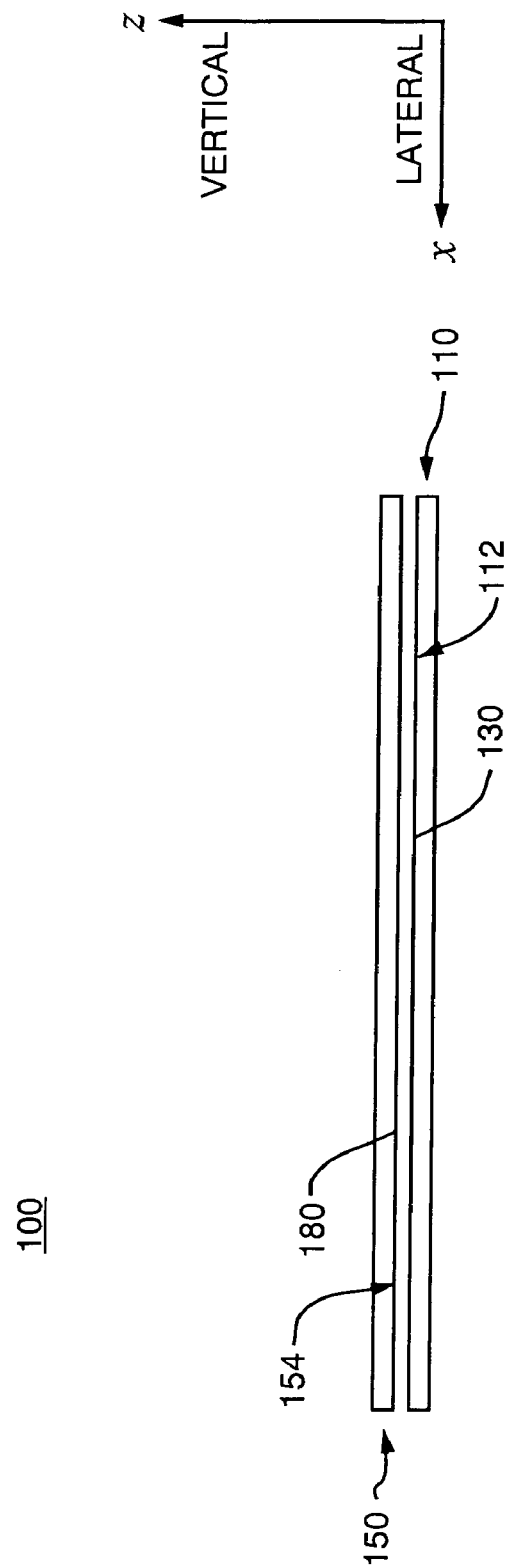

Turning now to the drawings, FIGS. 1A-1B show the components of a cellular structure that can be contiguously bonded together in accordance with some embodiments of the invention. The structure components are depicted separately in a perspective exploded top view, as shown in FIG. 1A, and can be joined together to form a laminate structure 100 as shown in side view of FIG. 1B. The laminate structure 100 comprises a first textile layer 110 and a second textile layer 150 that are contiguously bonded together. In the embodiment illustrated in FIGS. 1A-1B, each textile layer comprises an array of woven structural support members, which are weft and warp fibers, that are arranged and fixed in predetermined dimensions. Accordingly, the first textile layer 110 comprises a first array 120; the first array 120 is made up of first structural support members 122; which first structural support members 122 are shown as first warp fibers 124 and first weft fibers 125; which first structural support members 122 are arranged according to first predetermined dimensions 126; which first predetermined dimensions 126 include warp spacing 127 and weft spacing 128; and which first textile layer 110 has a top side 112 and a bottom side 114. Similarly, the second textile layer 150 comprises a second array 160; the second array 160 is made up of second structural support members 162; which second structural support members are shown as second warp fibers 164 and second weft fibers 165; which second structural support members 162 are arranged according to second predetermined dimensions 166; which second predetermined dimensions 166 include warp spacing 167 and weft spacing 168; and which second textile layer 150 has a top side 152 and a bottom side 154.

To form the vertically stacked repeating cellular structure, two or more textile layers (i.e., layers $i^{th}$ through N, where i=1, 2, 3, 4 . . . N) contiguously disposed to one another and discretely bonded at a plurality of points. Bonds within textile layers and bonds between textile layer arrays are discrete—that is, sufficiently localized to points of intersection between support members to allow for the invention to be practiced commensurate with its advantages (that is, there is adequate fluid flow through the lattice, adequate surface area for the application desired, adequate load bearing, and the like). It should be recognized that not all points of contact need to be bonded. Moreover, it is possible some forms of the embodiments will not have any bonding between select adjacent textile layers or plates.

The region of an array in a textile layer that is joined to another textile layer or face sheet is an adjoining layer. For example, the side view in FIG. 1B illustrates that the laminate cellular structure 100 is formed by the joining of the first textile layer 110 to the second textile layer 150. The region of the top side 112 of the first textile layer 110 that is in contact with the bottom side 154 of the second textile layer 150 is called the first adjoining region 130, while the region of the bottom side 154 of the second textile layer 150 that is in contact with the top side 112 of the first textile layer 110 is called the second adjoining region 180. In some preferred embodiments, the first adjoining region 130 comprises the entire top side of the first array 120 and the second adjoining region 180 comprises the entire bottom side of the second array 160. However, it could be limited to only a partial area of a side, or no area at all for select layers.

In order to allow for effective fluid flow through the cellular structure 105, the second structural support members 162 of the second array 160 can be vertically aligned with respect to the first structural support members 122 of the first array 160. The degree of vertical alignment and the method of alignment can vary and be selected from any appropriate means known to the skilled practitioner of the invention. In preferred embodiments, the degree of vertical alignment is adequate to provide the degree of fluid flow desired (that is, a "fluid flow effective degree" of vertical alignment). FIG. 1A illustrates three imaginary vertical alignment lines 140 to show vertical alignment of the second structural support members 162 of the second array 160 with respect to the first structural support members 122 of the first array 120, along a first alignment line 142, a second alignment line 144, and a third alignment line 146. The embodiment disclosed in FIGS. 1A-1B is merely an example of one plausible method of vertical alignment and in no way suggests that the invention must be limited to three points of vertical alignment.

In other embodiments the degree and amount of alignment can vary. For example the textile layers could be in a peak-to-trough alignment, rather than peak-to-peak. Alternatively, the textile layers could be quite different. For example, a square weave layer could be bonded to a rectangular weave layer, which in turn could be bonded to a hexagonal weave. Still yet, the present invention may include two or more different mesh-per-inch weaves bonded together. The embodiments may not be periodically aligned, or rather periodically aligned in varying degrees. Regardless, they may still be joined together and laminated and still accomplish the objectives of the present invention.

Figure 2A:
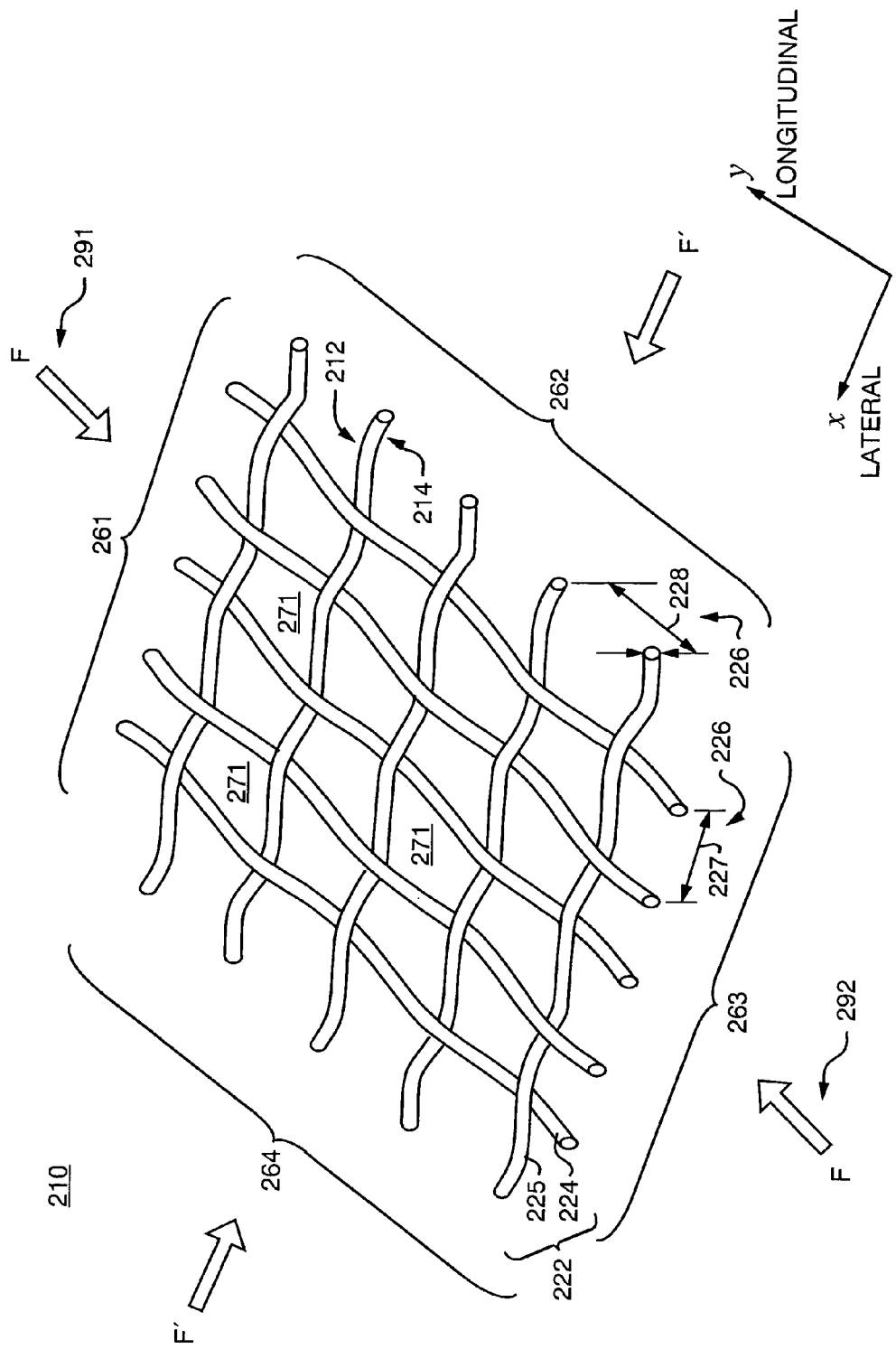
FIGS. 2A-2B show a schematic top perspective view and side view, respectively, of an array-based cellular structure that is made by vertically stacking a series of textile layer arrays.
Figure 2B:
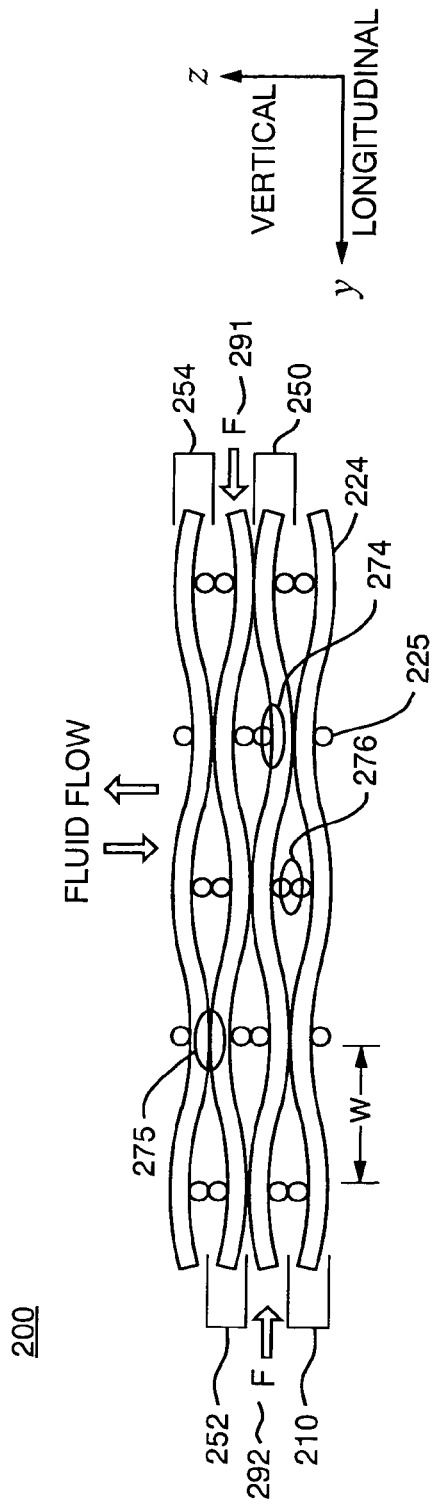

While FIGS. 1A-1B depict two textile layers wherein the array is smaller than the surface area of the textile layer, in some embodiments, such as FIGS. 2A-2B, the entire textile layer is the array. FIG. 2A shows a top perspective view of a textile layer array 210 and FIG. 2B shows a side view of an array-based cellular structure 200 that is made by vertically stacking a series of textile layer arrays.

Referring to FIG. 2A, the textile layer array 210 is shown as a woven material made from woven structural support members 222, which comprise weft fibers 225 and warp fibers 224, which structural support members 222 are arranged according to first predetermined dimensions 226; which first predetermined dimensions 226 include warp spacing 227 and weft spacing 228; and which textile layer array 210 has a top side 212 and a bottom side 214. There between the intersecting structural support members are formed predetermined geometric apertures 271. The geometric shape can be any two-dimensional or three-dimensional shape that is known. The structural support members 222 can be characterized by a cross-sectional diameter d and can be made from any suitable material known to the practitioner of the invention, including without limitation, wires, filaments, or tubes. The cross-sectional shapes of the structural support members can be any shape (e.g., circular, oval, square, rectangular, polygonal, hexagonal, etc.). In some embodiments, the structural support members 222 can be magnetic, electrically conducting or insulating materials; in some embodiments, the structural support members 222 can be foam-filled or liquid-filled tubes; in some embodiments, the structural support members 222 can be feroelectric or piezoelectric materials. The material can extend to at least any one of the following: metal, ceramic, alloy, polymer, semiconductor, or any composite/combination thereof.

The array based cellular structure 200 as shown in FIG. 2A has a perimeter as defined by four perimeter sides 261, 262, 263, 264. In the embodiment shown, the warps 224 run in a longitudinal direction (y-axis) and the wefts 225 run in a lateral direction (x-axis). Perimeter sides denoted as 261 and 263 generally define the longitudinal ends/sides, and perimeter sides denoted as 262 and 264 generally define the lateral ends/sides.

Turning to FIG. 2B, multiple textile array layers can be contiguously disposed to one another and discretely bonded at a plurality of points to form the three-dimensional repeating (periodic) cellular structure. For example, a cellular structure 200 can be formed by the joining of the textile layer array 210 to a second textile layer array 250, joining of the second textile layer array 250 to a third textile layer array 252, joining of the third textile layer array 252 to a fourth textile layer array 254. The textile array layers can be joined consecutively or simultaneously, and can be aligned with respect to each other to permit a desired degree of directional low resistance fluid flow and load bearing capability. For example, the vertical alignment of the textile array layers and the discrete bonding in the array based cellular structure 200 allows for a desired amount of load bearing in a load bearing direction 291, 292 as indicated by arrow F, and a desired amount of fluid flow in a fluid flow vertical direction, substantially perpendicular to the textile layers. Of course, one skilled in the art would appreciate that the structure would also provide a desired amount of load bearing in a load bearing direction perpendicular to directions 291 and 292, as indicated by arrows F'. Similarly, load bearing is provided in the same direction as shown for the fluid flow.

Still referring to FIG. 2B, the discrete bonding character of bonds is illustrated. For example, within each textile array layer an intra-array bond designated as 274 is formed between the warp and weft within the same layer. Also shown is a first inter-array bond type 275 that bonds between array layers as shown in a peak-to-peak fashion on the warps. A second inter-array bond type 276 is shown that bonds between array layers as shown in a peak-to-peak fashion on the wefts. As discussed previously, bonding at all contact points is not necessarily required, and in some instances can be omitted on select layers or plates.

Figure 3B:
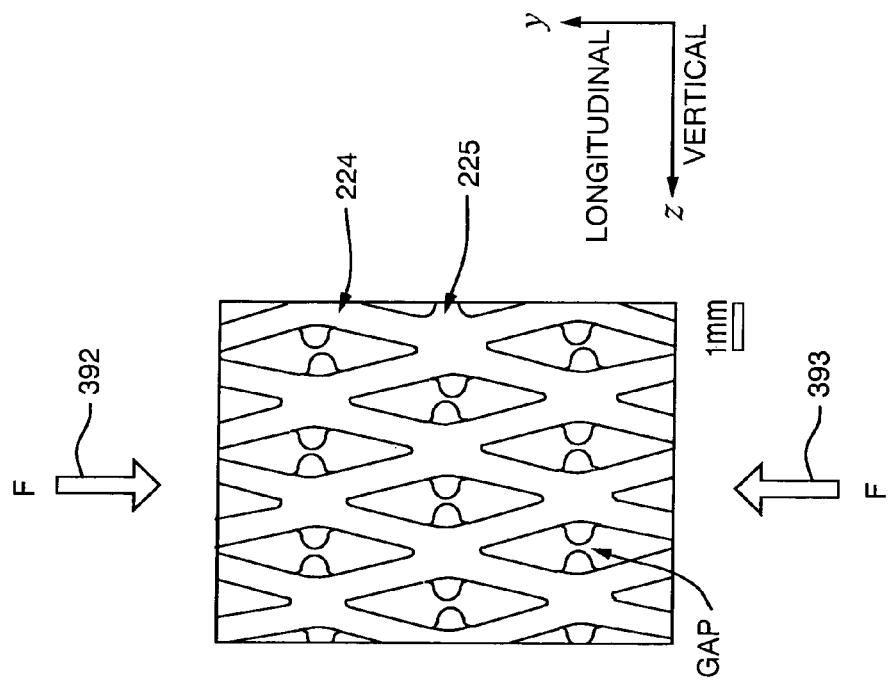
FIG. 3B shows an enlarged partial side view of the structure shown in FIG. 3A.
Figure 3A:
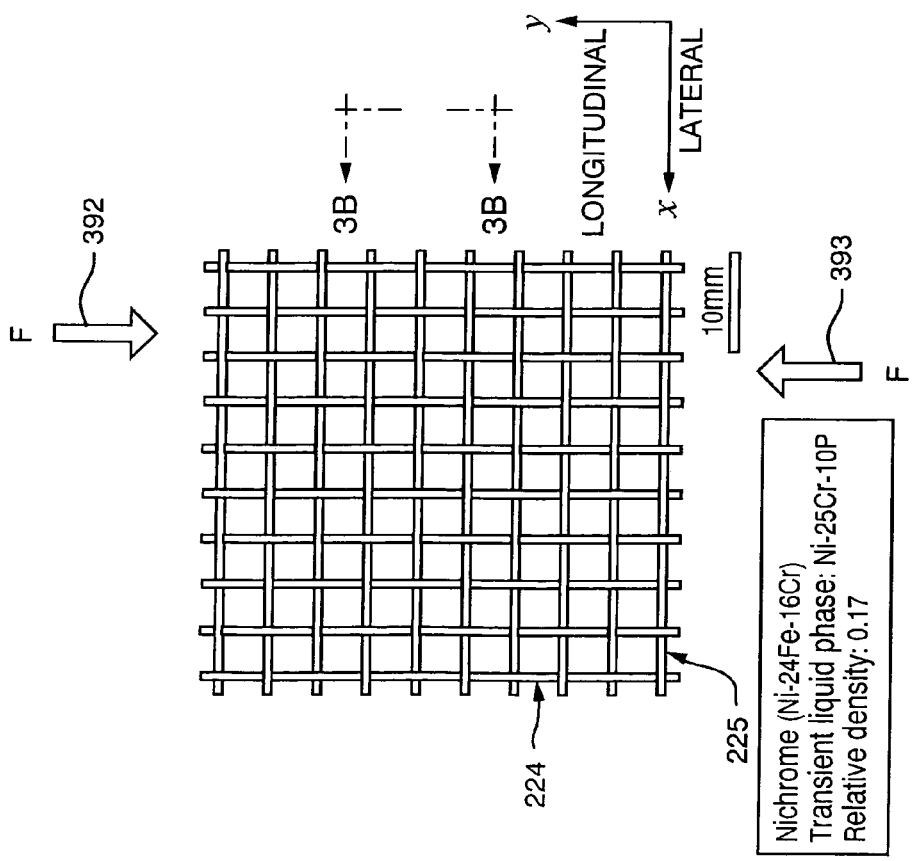
FIG. 3A shows an electron micrograph depiction of a front view of a mesh array-based multifunctional made by vertically stacking textile array layers.

FIG. 3A shows an electron micrograph depiction of a front view of a mesh array-based multifunctional made by vertically stacking textile array layers. FIG. 3B shows an enlarged partial side view of the structure shown in FIG. 3A. The array-based multifunctional is designed to bear weight, for example, along a first load bearing direction 392 or in the opposite direction, a second load bearing direction 393. The first load bearing direction 392 and the second load bearing direction 393, as shown by arrows F. The remaining directions (z-axis; vertical and x-axis; lateral) also provide load bearing as well.

Figure 4:
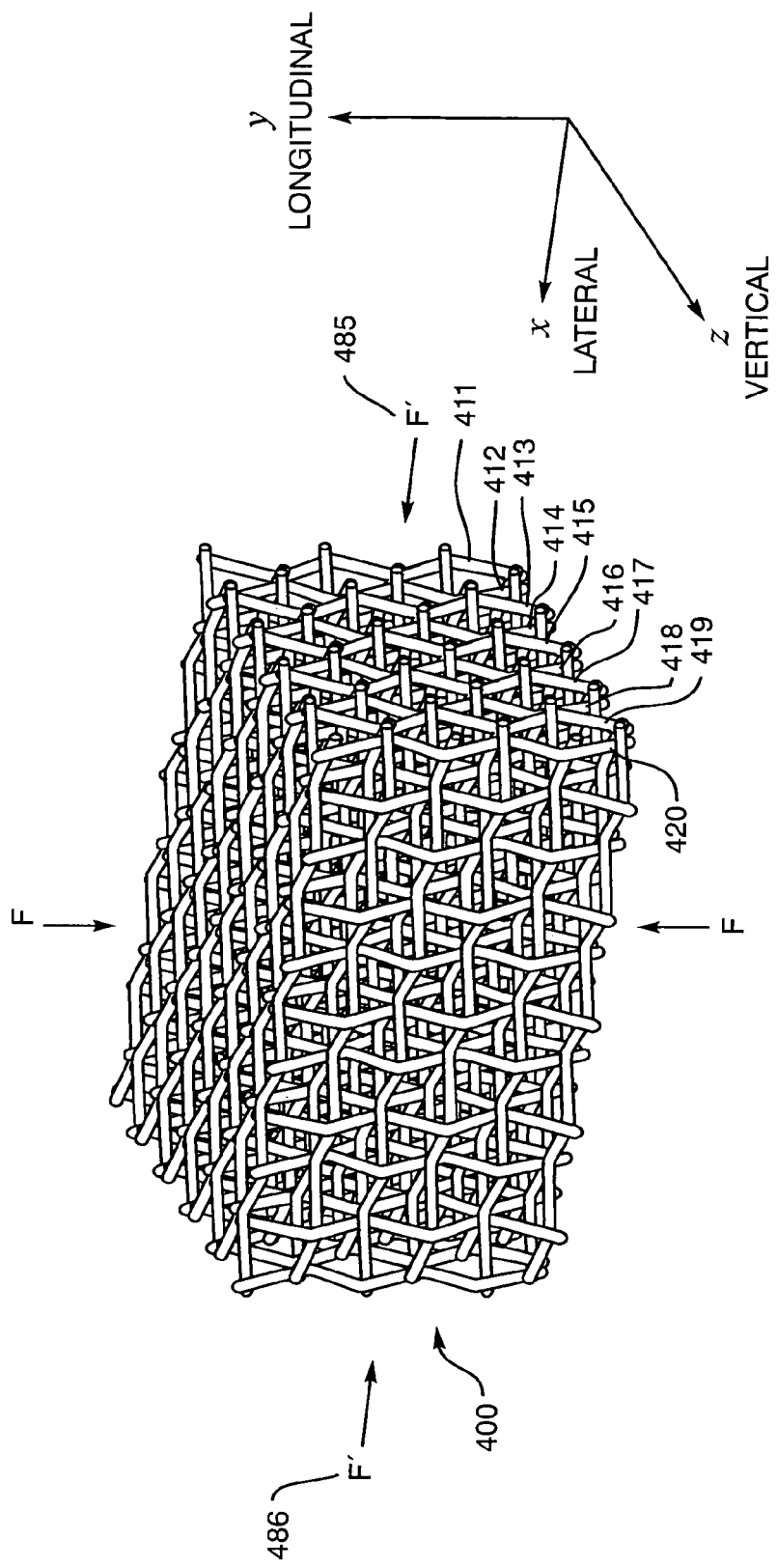
FIG. 4 shows a front/side isometric view of an array based core structure.

FIG. 4 shows a front/side isometric view of an array based core structure 400. In this embodiment, 10 vertically stacked textile array layers 410 (designated as layers 411 through 420 stacked along z-axis) are aligned in a fluid flow permitting manner and discretely joined to form the core structure 400 that is designed, among other directions, to bear weight along a first load bearing direction 485 or in the opposite direction, a second load bearing direction 486, designated by arrows F' along the lateral, x-axis.

Figure 5A:
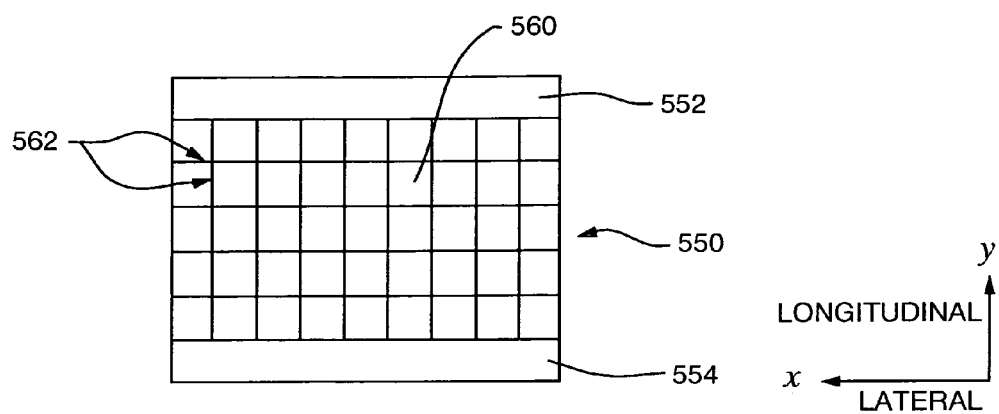
FIGS. 5A-5B show a schematic representation of the components of a cellular structure that can be contiguously bonded together including one or more arrays of different patterns.
Figure 5B:
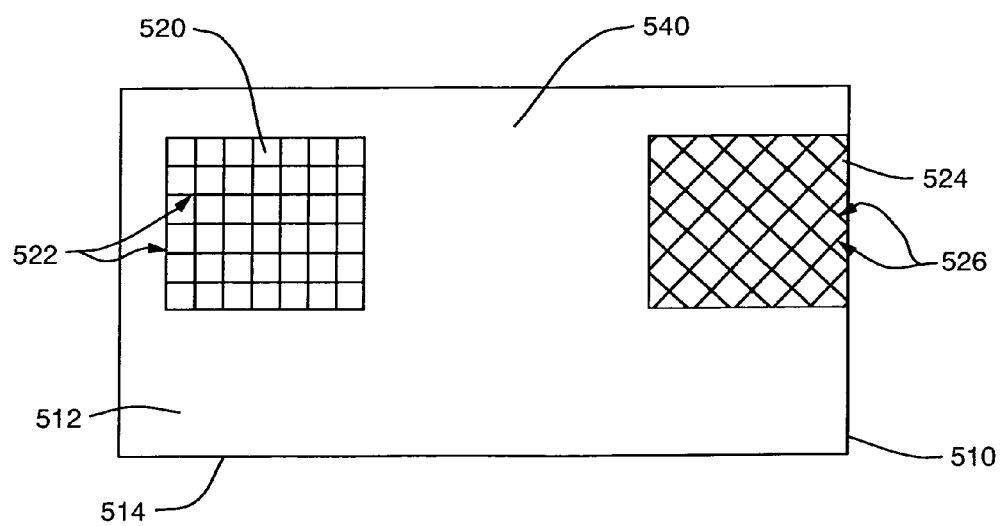

It is set forth that a given layer may be a sheet without an array, or may comprise one or more arrays, which arrays can have similar or different configurations. Layers can have unique physical or chemical properties. FIGS. 5A-5B show a schematic top view, similar to the embodiment illustrated in FIGS. 1A-1B, of a cellular structure components that are depicted separately, and which can be joined together to form a cellular structure.

The components of the structure comprises a first textile layer 510 and a second textile layer 550 that are contiguously bonded together. However, unlike the embodiment illustrated in FIGS. 1A-1B, each textile layer in FIGS. 5A-5B comprises one or more arrays of different patterns (e.g., different predetermined dimensions, geometric configurations, geometric apertures, or mesh/inch) of woven structural support members mounted in a panel. Accordingly, the first textile layer 510 comprises a panel region 540 containing a first array 520 and a separate second array 524; the first array 520 is made up of first structural support members 522; the second array 524 is made up of second structural support members 526; which first structural support members 522 are arranged according to first predetermined dimensions (not shown) and which second structural support members 526 are arranged according to second predetermined dimensions (not shown); and which first textile layer 510 has a top side 512 and a bottom side 514. Similarly, the second textile layer 550 comprises a third array 560; the third array 560 is made up of third structural support members 562; which third structural support members 562 are arranged according to a third type of predetermined dimensions and geometries (not shown); and which second textile layer 550 has a top side 552 and a bottom side 554.

It is noted that the three-dimensional repeating cellular structures can also be effected. Still referring to FIGS. 5A-5B, it is set forth herein that two (or more) textile layers can be contiguously disposed to one another and discretely bonded at a plurality of points to allow for adequate fluid flow through the lattice, adequate surface area for the application desired, adequate load bearing, and the like. For example, this is accomplished by the joining of the first textile layer 510 to the-second textile layer 550 by the formation of discrete bonds (as described for other embodiments above). The region of the top side 512 of the first textile layer 510 that is in contact with the bottom side 554 of the second textile layer 550 is called the first adjoining region, while the region of the bottom side 554 of the second textile layer 550 that is in contact with the top side 512 of the first textile layer 510 is called the second adjoining region.

The first adjoining region and the second adjoining region are imaginary planes comprising points of intersection between the arrays of the textile layers. Therefore, the first adjoining region is a plane that includes: (1) those portions of the first structural support members 526 of the second array 524 that are discretely bonded to portions of the third structural support members 562 of the third array 560; (2) those portions of the second structural support members 522 of the first array 520 that are discretely bonded to portions of the third structural support members 562 of the third array 560; and (3) those portions of the panel region 540 that are discretely bonded to portions of the third structural support members 562 of the third array 560. Similarly, the second adjoining region includes: (1) those portions of the third structural support members 562 of the third array 560 that are discretely bonded to portions of the first structural support members 522 of the first array 520; (2) those portions of the third structural support members 562 of the third array 560 that are discretely bonded to portions of the second structural support members 526 of the second array 524; and (3) those portions of the third structural support members 562 of the third array 560 that are discretely bonded to the panel region 540.

In order to allow for effective fluid flow through the cellular structure 500, the first structural support members 522 of the first array 520 can be vertically aligned (out of the plane of the paper) with respect to the third support members 562 of the third array 560. The degree of vertical alignment can vary depending on the design, and the method of alignment can vary and be selected from any appropriate means known to the skilled practitioner of the invention. In preferred embodiments, the degree of vertical alignment is adequate to provide the degree of fluid flow desired (that is, a "fluid flow effective degree" of vertical alignment), for example as described for FIGS. 1A-1B above, while maintaining structural integrity.

Figure 6A:
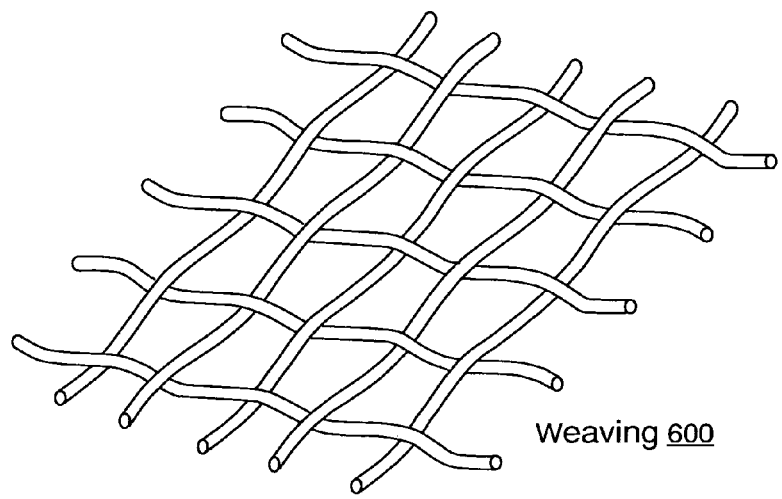
Figure 6B:
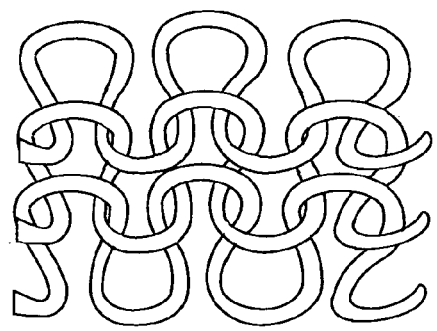
Figure 6C:
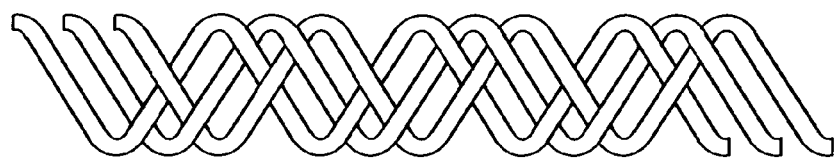
Figure 6D:
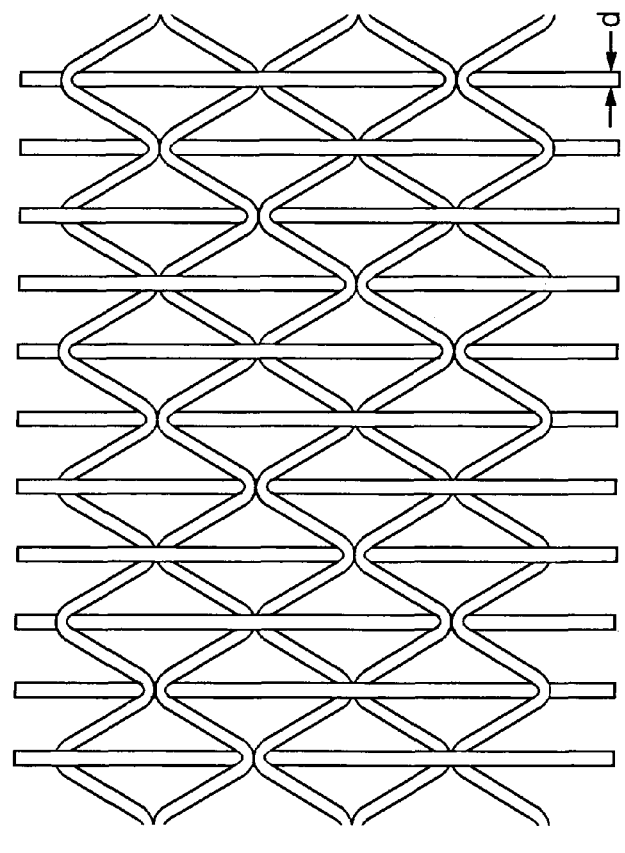

While the embodiments described above have focused on woven textile arrays, any suitable material may be used. FIGS. 6A-6F show some non-limiting examples of woven 600, knitted 605, braided 610, triaxial 615, and biaxial 625, pre-crimped quasi-triaxial 630, 3-D braid textile 635, 3-D multi-ply weave 640, 3-D triaxial weave 645, 3-D multi-axial weave 650, 3-D 'H' or 'I' beam 655, 3-D honey-comb type 660 configurations, respectively, that can be used in arrays. Also shown with FIG. 6A are illustrative design parameters and material types for plain square woven metal cloth. Finally, other textile type classifications may be implemented as shown in the schematic views compiled in FIG. 6E As will be discussed in greater detail below, in some of the embodiments, the cellular structures of the invention can comprise textile layers and one or more rigid face sheets in a laminate configuration. Briefly, in some embodiments, one or more of the face sheets can be disposed on the front or face of the stacked textile layers, i.e., in a textile layer-oriented plane. Still yet in other embodiments, one or more of the face sheets can be disposed on the longitudinal ends (or cross-sections) of the warp structural members. Or similarly, one or more of the face sheets can disposed on the lateral ends (or cross-sections) of the weft structural members.

Similarly, various combinations may be implemented. One or more textile layers and/or one or more face plates may be included. Moreover, any number of textile layers may be attached between the face plates (or only on one face plate). And any number of face plates may be joined together, and the plates may be of different designs and aligned in different directions.

Figure 7A:
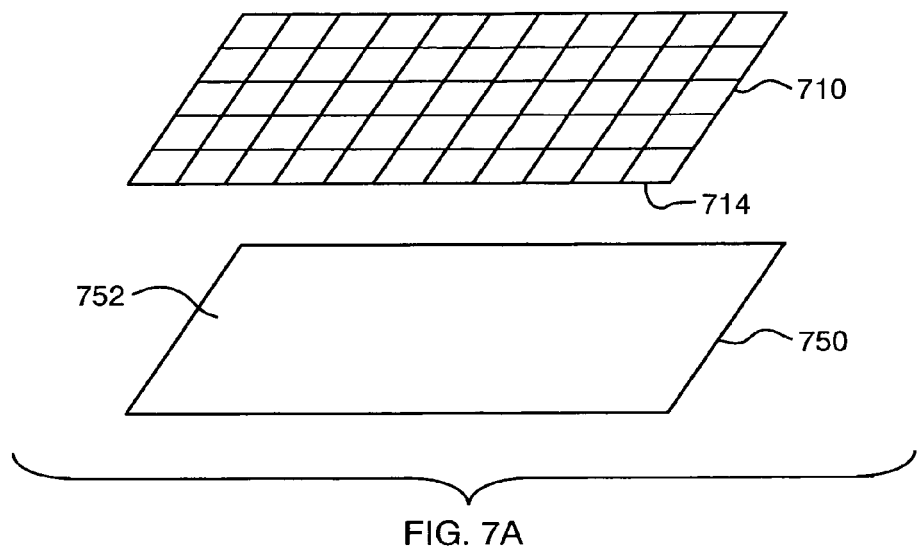
FIGS. 7A-7F show schematic exploded views of the parallel configuration of a textile and corrugated layer having a face sheet(s).
Figure 7B:
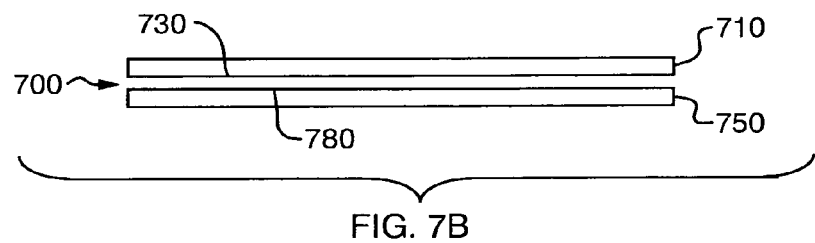

For example, FIG. 7A shows a schematic exploded view of the parallel configuration of a textile layer and a face sheet. Specifically, FIG. 7A schematically shows structural panel components 702 that can be contiguously bonded together in accordance with some embodiments of the invention to form a structural panel 700 as shown in FIG. 7B. The structural panel 700 comprises a face sheet 750 and a first textile layer 710 that are contiguously bonded together. In some embodiments, further textile layers (not shown) can be contiguously disposed and discretely bonded to the first textile layer 710 in a vertically stacking manner. In the embodiment illustrated in FIGS. 7A-7B, the entire first textile layer 710 is an array 720 of woven structural support members (not shown), which can be weft and warp fibers arranged and fixed in predetermined dimensions forming apertures, having predetermined geometric configurations. The first textile layer 710 is bonded to the face sheet 750, preferably at discrete points, and oriented to be substantially in plane or parallel with the textile layers.

Figure 7C:
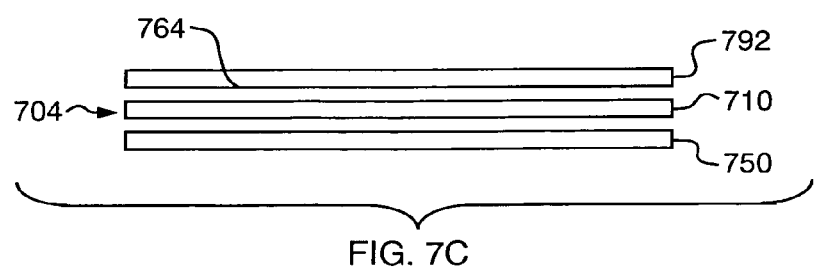

Turning to FIG. 7C, in some embodiments, a parallel structural panel sandwich 704, can be formed by discretely bonding parts or all of the top 712 of the first textile layer 710 of the panel structure 700 to parts or all of the bottom 764 of a second face sheet 792. Identification of the adjoining regions can be done analogously to the embodiments above. For instance, turning to the core 400 as shown in FIG. 4, a face sheet can be bonded substantially in plane or parallel with each of the first and last ($N^{th}$) textile layers (or alternatively/additionally between some of the interior layers of the stack). For example, the side view in FIG. 7B illustrates a structural panel 700 formed by discretely bonding the bottom 714 of the first textile layer 710 to the top 752 of the first face sheet 750.

Figure 7D:
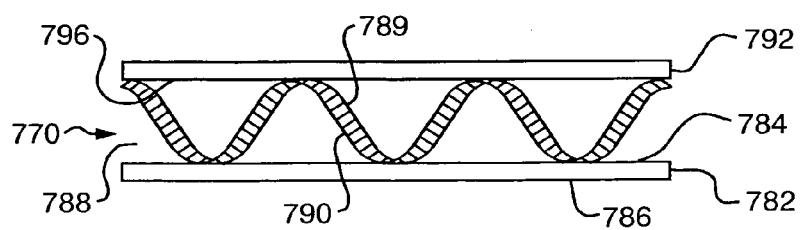

Next, as shown in FIG. 7D, in a particularly preferred embodiment, the structural panel sandwich structure can comprise at least a single corrugated textile layer (or more) between two parallel face plates, to form a corrugated structural panel sandwich 770. The corrugated structural panel sandwich 770 comprises a bottom face sheet 782, preferably a rigid face sheet, a corrugated first textile layer 788, and a top rigid face sheet 792, wherein the top 784 of the bottom face sheet 782 is periodically bonded to the bottom 790 of the corrugated first textile layer 788, and the top 789 of the corrugated first textile layer 788 is periodically bonded to the bottom 796 of the top face sheet 792. In some embodiments, for example, additional textile layers can be bonded between the top 789 of the corrugated first textile layer 788 and the bottom 796 of the top rigid face sheet 792. Moreover, additional textile layers could be implemented while utilizing only a single face sheet.

Figure 7E:
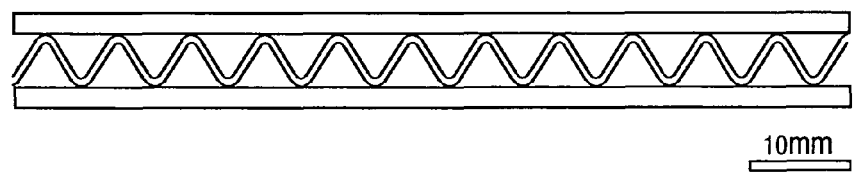
Figure 7F:
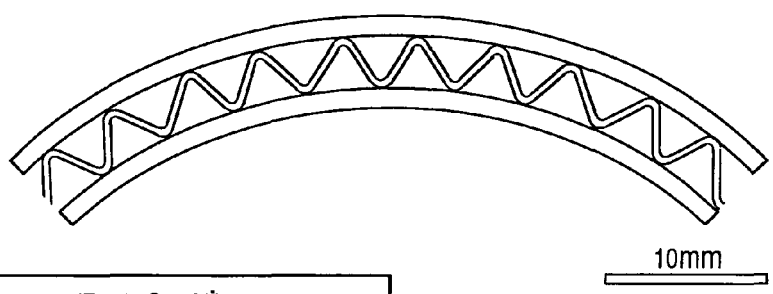

Similarly, FIGS. 7E and 7F show a side view micrographic depiction of a corrugated structural panel sandwich being of the flat and curved design, respectively. The corrugated sandwich provides numerous advantages including but not limited to high fluid permeability, complex shapes, crack resistance, material selection, and relatively inexpensive manufacturing costs.

Figure 8:
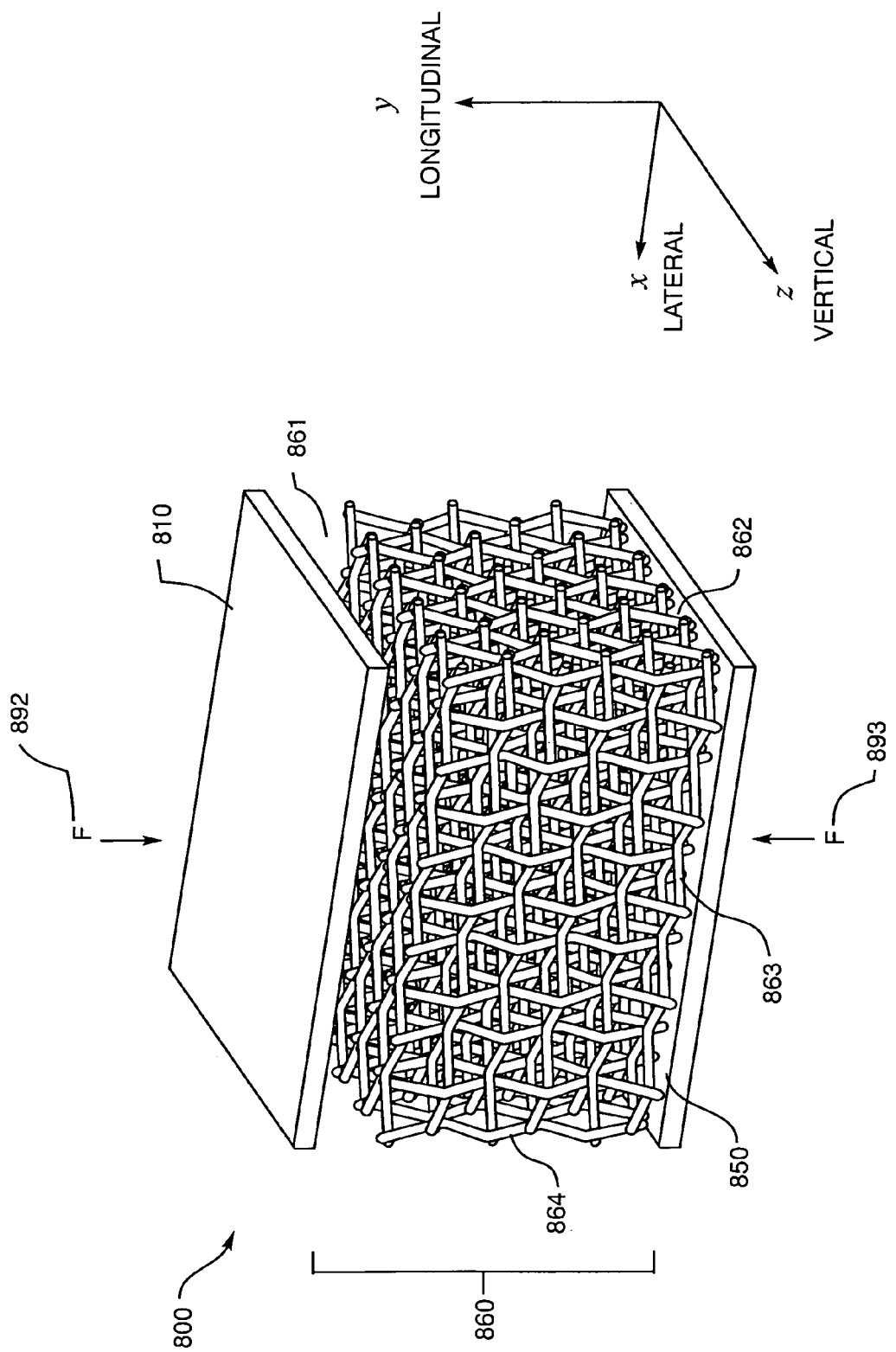
FIG. 8 shows a front/side isometric view of an array-based core structure in a panel sandwich configuration.

FIG. 8 shows a front/side isometric view of an array-based multiple layer structural panel sandwich 800 wherein one or more of the face sheets can be disposed on the longitudinal ends of the warp structural members. In this embodiment, 10 textile array layers are aligned in a fluid flow permitting manner and discretely joined to form the cellular core structure 860. The first rigid face sheet 810 is joined to the core 860 on the perimeter sides 861 of some or all of the longitudinal ends of the textile arrays. The second rigid face sheet 850 is joined to the core 860 on the opposite perimeter sides 863 on the opposite longitudinal ends of the textile arrays. The face sheets can be joined to the cellular core by any suitable means known to one skilled in the art. The array-based multiple layer structural panel sandwich 800 is preferably designed to dissipate heat evenly and, for example, to bear weight along a first load bearing direction 892 or in the opposite direction, a second load bearing direction 893, as indicated by arrow F (y-axis direction). Similarly, each of the rigid face panels could have been attached to the opposite perimeter sides 862, 864 at or near the lateral ends (i.e., weft structural members) of the textile arrays.

Figure 9:
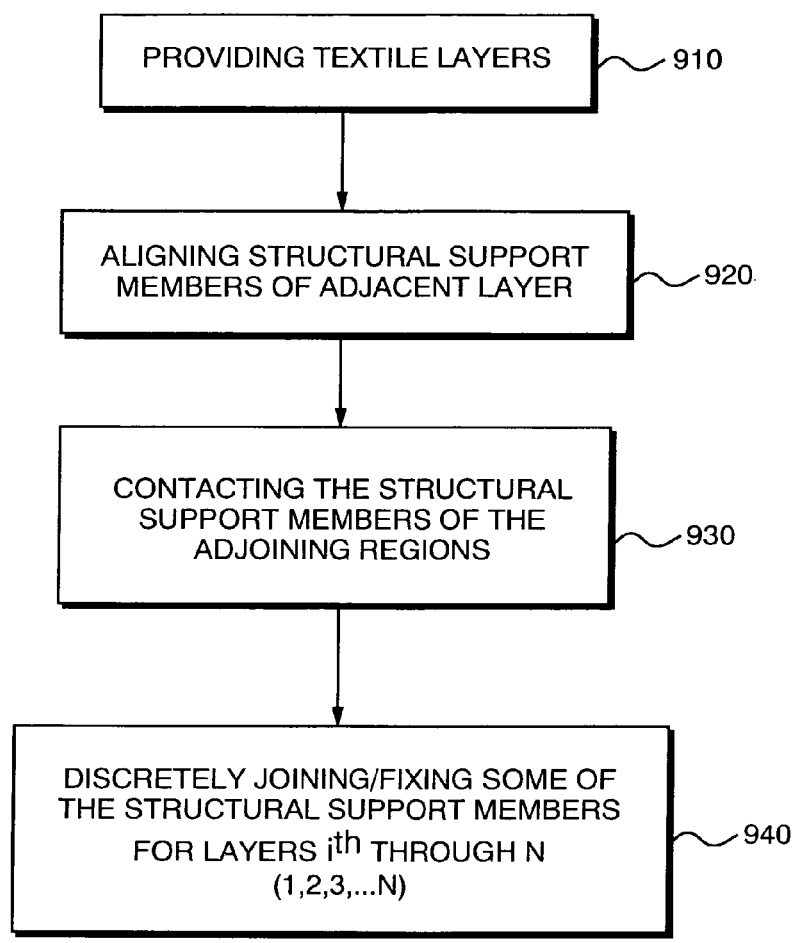
FIG. 9 shows a flow chart that schematically illustrates a method for producing cellular structures of the present invention.

FIG. 9 shows a flow chart that schematically illustrates a method for producing cellular structures of the invention. Although these steps are illustrated in a particular order in the flowchart of FIG. 9, the steps may be performed in various orders suitable to a given application. In some embodiments, the invention provides methods for constructing laminate cellular structures and structural panels. In some embodiments, the method can comprise the steps of (1) providing one or more textile layers 910; (2) aligning the structural support members of the adjoining regions to achieve a perpendicular-fluid-flow-effective degree of vertical alignment between them 920; (3) contacting the structural support members various adjoining regions 930; and (4) discretely joining/fixing some of the structural support members of the adjoining regions with each other 940.

In some embodiments, discrete joining can be accomplished by using braze to join metal wire structural members, and allowing discrete bonds to form via capillary action along the wires. Alternatively, in other embodiments, the structural members can be provided as cladded wires or textiles as shown in U.S. Pat. No. 4,130,233 to Chisholm, which is incorporated herein by reference in its entirety.

In addition, in some embodiments, the method of making the cellular structure further comprises: providing a perimeter-oriented face sheet having an inner surface and an outer surface; and bonding the inner surface of the face sheet to one of the perimeter sides of at least a minority of each of the textile layers. Similarly, the method further comprises: providing a second perimeter-oriented face sheet having an inner surface and an outer surface; and bonding said inner surface of said second face sheet to a second one of said perimeter sides of at least a minority of each of said textile layers.

In other embodiments, the method of making the cellular structure further comprises: providing a layer-oriented face sheet having an inner surface and an outer surface; and bonding the inner surface of the face sheet to portions or all of the bottom side of the first textile layer. Similarly, the method further comprises: providing a second layer-oriented face sheet having an inner surface and an outer surface; and bonding the inner surface of said second face sheet to portions or all of the top side of the $N^{th}$ textile layer.

Materials

A variety of materials can be used as textile layers in the present invention, including woven, braided, mesh and knitted wires, filaments, or tubes. For example, woven wire mesh materials have the advantages of being readily available, permitting close control of uniformity in the number, size and shape of pores, and in tensile strength, as well as being adapted for fabrication and being relatively low-cost. Various forms of such materials can be commercially obtained, ranging from wire mesh purchased off-the-shelf to wire mesh specially treated so as to better suit them for the purposes of the cellular structure or cellular panel. Knitted wire mesh can have a high resiliency or low Young's Modulus (modulus of elasticity). Some knitted wire mesh can be stretched over 100% in any direction, despite the non-resiliency of the wire filaments of which it is made up.

Structural panels of the invention can have good rigidity, high tensile strength, high compressive and shear strength, and can be resistant to swelling from moisture, weathering, and freezing and thawing cycles.

Structural panels of the invention can also be fabricated easily and at relatively low cost. Face sheets are can be made of metal material, such as aluminum or other metallized sheet, or a metallized layer formed on a suitable substrate. However, fiberglass or structurally hard plastic (ABS) sheets can also be used. The material can extend to at least any one of metal, alloy, ceramic, polymer, semiconductor, or any composite/combination thereof.

Architectural Design

The present invention provides for cellular structures with physical properties that can be designed to provide certain desired combinations of physical, chemical or material properties. One of the advantages of the structures of the invention is that their design can be easily tailored to produce certain combinations of physical properties, with a sufficient predictability for many applications to allow for rational and low-cost design of multifunctional structures. For example, in some preferred embodiments, the invention provides cellular structures with efficient in-plane load support, excellent mechanical energy absorption and high convective heat transfer with an ease of fluid flow through the cellular structures that allows for low pumping requirements.

Load Bearing Characteristics

To consider relationships between structural design of the laminate cellular structures of the invention and their mechanical load bearing strength, one can begin by considering plain square woven cylindrical wires of diameter d and opening width w of the embodiments discussed herein. For mesh of low relative density, the angle that warp and weft wires must bend as they pass over and under one another during weaving is small and will be neglected for simplicity. The validity of this approximation improves with decreasing relative density as the bending angle is reduced. From analysis of the structure as a sequence of stacked rather than woven wires, the relative density is:

$$\rho/\rho_s = \pi d/4(w+d) \quad (3)$$

When loaded parallel to a set of wires, the wires aligned in the loading plane support all of the load. If they do not buckle, the relative Young's modulus is half of that expected by a rule of mixtures approximation:

$$E/E_s = 0.5(\rho/\rho_s) \quad (4)$$

Similarly, for the relative compressive yield strength (assuming no wire buckling), $$\sigma_c/\sigma_{ys} = 0.5(\rho/\rho_s) \quad (5)$$

Similar linear relations can also be used to model other simple geometries (for example, rectangular weave) with adjustment of the proportionality constant to reflect the area fraction of material in the loading plane. Designer stiffness and strengths that are higher (or lower) than given by Equations (4) and (5) are obtained in this fashion.

Equations (4) and (5) can also be used to predict the relative Young's modulus and the relative compressive yield strengths of multifunctional cellular structures that are constructed from a plurality of woven mesh stacked peak-to-peak, when one neglects the effect of the joint material and assuming no wire buckling.

At a core relative density of two percent, a truss structure is as much as ten times stiffer and stronger than its counterpart of the same relative density. Moreover, when face sheets are attached to the truss cores with relative densities around 30 percent, highly efficient structures are achieved that are far superior to those containing stochastic foams.

Design Criteria

When axially compressed, wires within the structure can buckle before they yield. To determine which mechanism initiates failure, the structure can be treated as a three-dimensional space-truss constructed, for a conservative estimate, from many simply supported columns of length, l=(w+d), and a second moment of area, I=$\pi d^4/64$. The buckling load for an individual wire is $P_B=\pi^2 E_s I/l^2$. When compressed in a direction parallel to a set of wires, is $P_B=2d(w+d)\sigma_b$, where $\sigma_b$ is the buckling stress. Upon substitution, buckling of individual wires is expected at $$\sigma_s \ge (E_s/2)(\eta/\eta_s)^3 \quad (6)$$

In a comparison of Equations (5) and (6), buckling precedes yielding when $$\eta/\eta_s <= (\sigma_{ys}/E_s)^{1/2} \quad (7)$$

which serves as a rough design criteria for selecting the wire type, diameter and spacing. Where failure by yielding dominates, a linear behavior dominates. Generally, buckling can be prevented by avoiding the use of long slender trusses or by utilizing truss cross sections of higher I (for example, I-beams). Tubular structural support members (for example, hypodermic tubing) can accomplish this purpose for very low-density structures with the possibility of also utilizing the space within the tubes (for example, for cooling flow, fuel storage, and the like). In the absence of buckling, the relative stiffness and strength of the cellular structures is expected to be slightly lower than predicted by Equations (4) and (5) due to bending of the warp and weft wires (they are not perfectly aligned with the direction of load) and microscopic imperfections. These imperfections cause wires (micro-trusses) to fail at reduced stresses which lowers the strength of the laminate and alters its energy absorption behavior. This can be advantageous, for example, the material is being used to protect objects that are sensitive to excessive peak loads and decelerations.

Energy Absorption

In general, good energy absorbing materials have long, flat stress-strain curves and collapse plastically at a constant (plateau) stress. The expected energy absorption behavior for the present cellular structures is characterized by a higher plateau stress than that of similar density stochastic foams in the prior art, which leads to a higher energy absorptive capacity. Furthermore, the potentially large open space between structural support members can accommodate significant ligament plastic collapse and a lengthy plateau. Compressed open cell metal foams have the needed open space for plastic collapse and exhibit this type of behavior. Their ligaments bend and buckle, absorbing work at nearly constant stress until impinging upon one another with an accompanying stress rise. Axially crushed thin-walled tubes exhibit a similar stress-strain behavior and are efficient energy absorbers. They plastically deform via a series of ring-like folds with values for the absorbed energy given by:

$$W_v^{tube} = 1.26 \, (\eta/\eta_s)^{5/3} \sigma_{ys} \epsilon_d \quad (8)$$

$$W_m^{tube} = 1.26 \, (\eta/\eta_s)^{2/3} (\sigma_{ys}\eta_s) \epsilon_d \quad (9)$$

where $W_v^{tube}$ is the absorbed energy per unit volume, $W_m^{tube}$ is the absorbed energy per unit mass, and $\epsilon_d$ is the compaction strain (when folds of the collapsed tube lock up). A thin walled tube is expected to be about three times more efficient at absorbing energy than a stochastic metal foam; and foam filled tubes are even better.

Heat Exchange

For heat exchange, a cellular structure or structural panel is envisaged as a system that transfers heat between a structure and a fluid. A dense, highly conductive open cell structure of large accessible surface area is preferred. A turbulent flow of tortuous path also aids convection but requires additional fluid pumping power. For compact applications, such as power electronics heat sinks, air conditioners and the like, a small overall size is desired. The surface area density (surface area to volume ratio) is an important parameter for heat exchange systems. For present invention cellular structures, the surface area density is approximately (using the stacked wires model):

$$\alpha_A = \pi(w+d) \quad (10)$$

suggesting a fine mesh for compact designs (but with a need for additional fluid pumping power). When fluids flow through such a structure, the situation resembles a bank of aligned cylinders in a cross flow. The heat transfer efficiency of stochastic open cell metal foams has been evaluated using this type of approximation. Recent work suggests optimal cell sizes in the millimeter range and relative densities of about 20%. Materials of choice for heat exchangers include aluminum and copper for their high thermal conductivity whereas nichrome is often used for electrical resistive heating.

Nickel-iron-chromium Ni—Fe—Cr alloys are known for their excellent corrosion resistance and high strength at elevated temperatures, making them good experimental candidates for high temperature multifunctional cellular structures. Nichrome (Ni—24Fe—16Cr) is one commonly woven Ni—Fe—Cr alloy. Like other commercially available metal cloths, wire diameters and spacings can range from a few microns to several centimeters. The Young's modulus and 0.2% offset yield strength for nichrome are nominally $E_s$=205 GPa and $\sigma_{ys}$=205 MPa.

In some particularly preferred embodiments, the invention provides nichrome cellular structures with aligned square openings in the millimeter size range (for efficient heat exchange) and low relative density for structural advantage over stochastic foams. A buckling mode of failure is to be avoided. Equation (7) estimates the relative density range for which this occurs, that is $\rho/\rho_s < 0.032$. This is below the relative density of commercially available plain square weaves.

General Considerations

The present invention provides a textile based approach to create low relative density cellular solid, for example by transient liquid phase bonding of woven nichrome wire cloth. In some embodiments, the resulting cellular structures are anisotropic. In one direction, the topology can be designed for efficient exchange by cross fluid flow (with low flow resistance). In the same and other directions, the cellular structures can be designed to efficiently support loads and absorb large amounts of mechanical energy.

The relative mechanical properties in the load support direction are generally higher than those of stochastic foams owing to the reduced bending inherent in the design. This is consistent with other truss architectures and becomes more pronounced as the relative density decreases. Low-density cellular structures of the present invention have the compliance and necessary open space for cell collapse, thereby absorbing large amounts of energy when compressed. This present invention synthesis technique allows one to tailor the topology of a wide variety of multifunctional cellular structures and panel structures in a simple, cost-effective way. The cellular and panel structures of the invention are not limited to metals. The various embodiments discussed herein can be tailored so as to provide various shapes, other than cubicle, for the overall structure of the cellular core. For instance the cellular core structures may include the following shapes, but not limited thereto: cylindrical, parabolic, pyramid, trapezoidal, conical, etc. Any plate can be adjoined to the core and formed or provided having similar shapes/contours.

Physical Properties

In certain preferred embodiments, the present invention cellular structures possess one or more of the following physical properties: (1) a relative Young's modulus of at least 0.01, wherein the relative Young's modulus is the ratio of the Young's modulus of the cellular structure to the Young's modulus of the material of the cellular structure; (2) a relative compressive strength of at least 0.01; wherein the relative compressive is the ratio of the compressive strength of the cellular structure to the compressive strength of the material of the cellular structure; (3) a surface area density of between about 500 $m^2/m^3$ and about 6,000 $m^2/m^3$; or (4) a relative density of between about 0.01 and about 0.500, wherein the relative density is the ratio of the density of the cellular structure to the density of the material of the cellular structure.

By comparison, DUOCEL open cell aluminum foams (ERG, Inc., Oakland, Calif.) have 560-3220 $m^2/m^3$, automotive radiators 600-1000 $m^2/m^3$, cryogenic heat exchangers 1,000-2,000 $m^2/m^3$, and gas turbine rotary regenerators 3000-6000 $m^2/m^3$. Excellent catalyst support opportunities also exist for the present cellular structures. The high surface area of the present invention aids catalytic activity while the uniform pores tend to distribute the flow evenly throughout.

Figure 18:
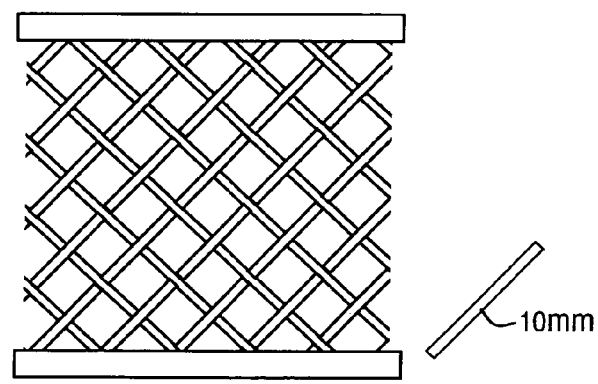
FIG. 18 shows an alternative embodiment wherein the faceplates are bonded at an angle across the general cubicle core.
Figure 18:
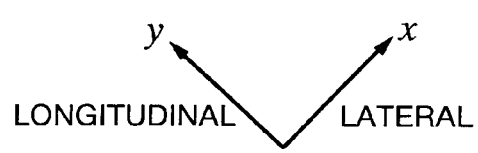

Moreover, as shown in FIG. 18, the faceplates can be bonded at an angle across the general cubicle core so as to provide a weave that appears to have a diamond shaped geometric aperture or other resultant shapes. For example, FIG. 18 has a core similar to the embodiment shown in FIG. 3, except that the core was machined whereby the plates were attached at an angled plain. Various cuts and contours can be made on various types of stacked cores.

EXAMPLES

Practice of the invention will be still more fully understood from the following examples, which are presented herein for illustration only and should not be construed as limiting the invention in any way.

Example 1

Construction of 8-Mesh and 16-Mesh Nichrome Cellular Structures

Twenty-two (22) laminae of plain square woven 8-mesh nichrome cloth (Newark Wire Cloth Co., Newark, N.J.) with 0.635 mm (0.025 in.) diameter wires and a 2.54 mm (0.100 in.) opening width, were used as textile layers for the constructing the 8-mesh nichrome cellular structure.

Twenty-two (22) laminae of plain square woven 16-mesh nichrome cloth (Newark Wire Cloth Co., Newark, N.J.) with 0.508 mm (0.020 in.) diameter wires and a 1.080 mm (0.0425 in.) opening width, were used as textile layers for constructing the 16-mesh nichrome cellular structure.

To join the textile layers together, all of the 22 nichrome cloth laminae were first submersed into a polymer based cement (NICOBRAZ CEMENT 520 supplied by Wall Colmonoy Corp., Madison Heights, Mich.). They were them coated with −140 mesh (diameter<106 mm) Ni-25Cr-10P braze alloy powder (NICOBRAZ 51 supplied by Wall Colmonoy Corp.). The solids and liquids of this braze alloy are 880 and 950 degrees C., respectively, whereas the solids of nichrome is about 1350 degrees C. The coated laminae were then stacked peak-to-peak (using pins to align all square openings), and a small compressive pressure was applied to the periphery of the lay-up. The coated assemblies were heated in vacuum of less than 10-2 torr at a rate of 10 degree C./min to 550 degrees C. for 1 hour to volatilize the polymer cement. An important feature of this braze/cement combination is that the braze alloy powders remain adhered to the wires after volatilization. The system was then evacuated to an oxygen gettered (Ti powder) vacuum level of less than 10-3 torr, and the temperature was them ramped at a rate of 10 degree C./min to 1120 degrees C. and held there for 1 hour. Samples were then furnace cooled to ambient and their sides were machined mutually orthogonal for testing. During this final heating, the braze alloy powders melted and were drawn by capillary action to points of wire contact. Interdiffusion then changed the contact composition and elevated its melting point causing solidification at the brazing temperature.

Example 2

Density and Surface Area of 8-Mesh and 16-Mesh Nichrome Cellular Structures The 8-mesh sample had a density of $\rho=1.43$ g/cm$^3$. Using $\rho_s=8.30$ g/cm$^3$ for nichrome, the corresponding relative density, $\rho/\rho_s=17\%$. The topology of the 17% dense laminate can be shown with the benefit of the illustration of FIGS. 3A-3B. Aligned square pores (square geometric configuration) were obtained in one direction for efficient cross flow with low flow resistance. In the other two directions, the pores assumed a diamond like shape. A large surface area to volume ratio was achieved. An approximate surface area density of 989 m$^2$/m$^3$ was determined using equation (10).

The 16-mesh sample had a density of $\rho=2.54$ g/cm$^3$. Using $\rho_s=8.30$ g/cm$^3$ for nichrome, the corresponding relative density, $\rho/\rho_s=31\%$. A large surface area to volume ratio was achieved. An approximate surface area density of 1,978 m$^2$/m$^3$ was determined using equation (10).

Example 3

Material Properties of 8-Mesh and 16-Mesh Nichrome Cellular Structures

As shown in FIGS. 13A-13F, cellular structures were compression tested in ambient (25 degrees C.) at a constant crosshead displacement rate of 0.005 mm/s using a screw driven testing instrument. A knife-edge extensometer of 10-mm and 10-mm contact was epoxy cemented to the center of one side for local strain measurement at low and intermediate strains. The displacement of the crosshead determined the fall sample strain. Illustrations before, after and at a 5% strain increments during the test recorded the deformation on the side opposite the extensometer.

Figure 10A:
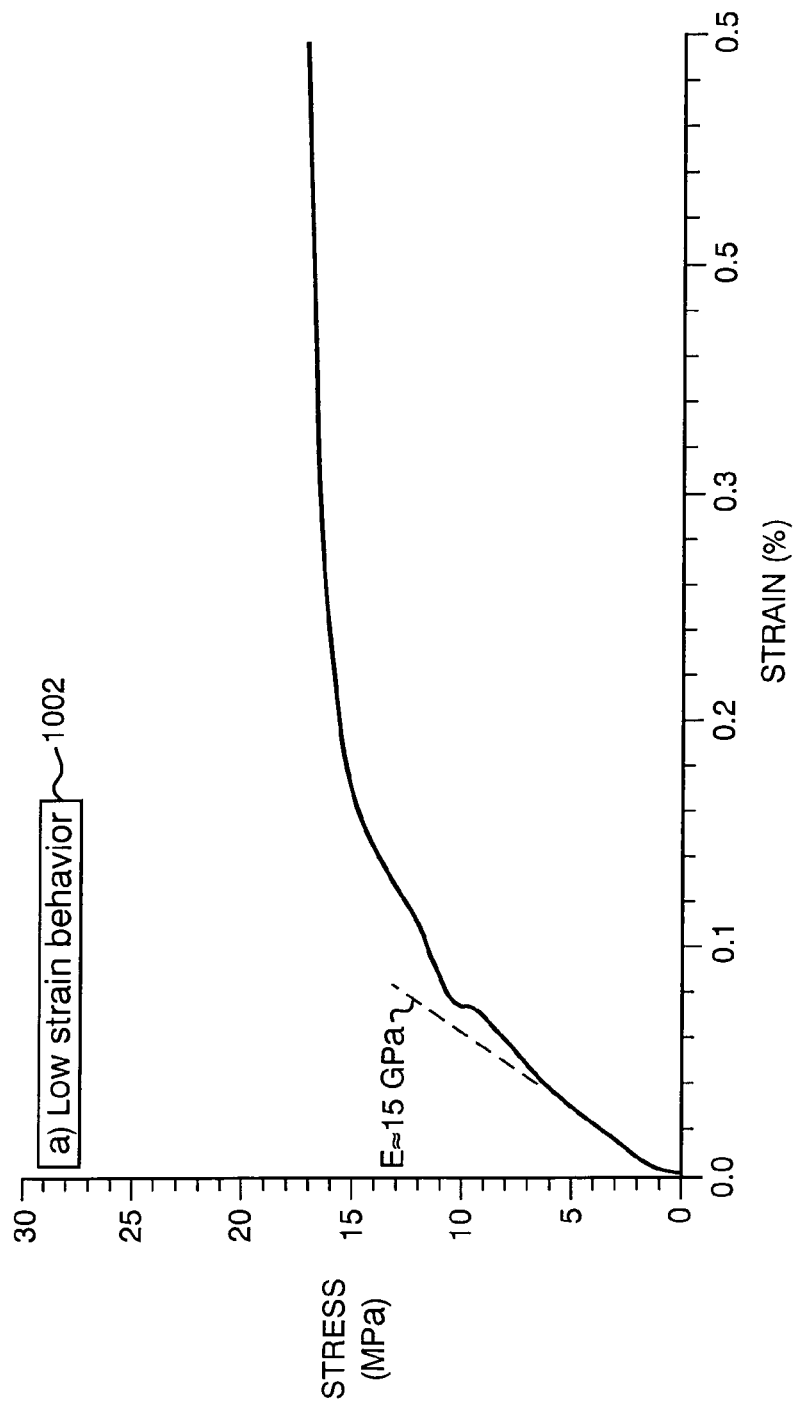
FIGS. 10A-10B show the graphical representation of the compressive stress-strain behavior for the 17% dense (8-mesh) laminate.
Figure 10B:
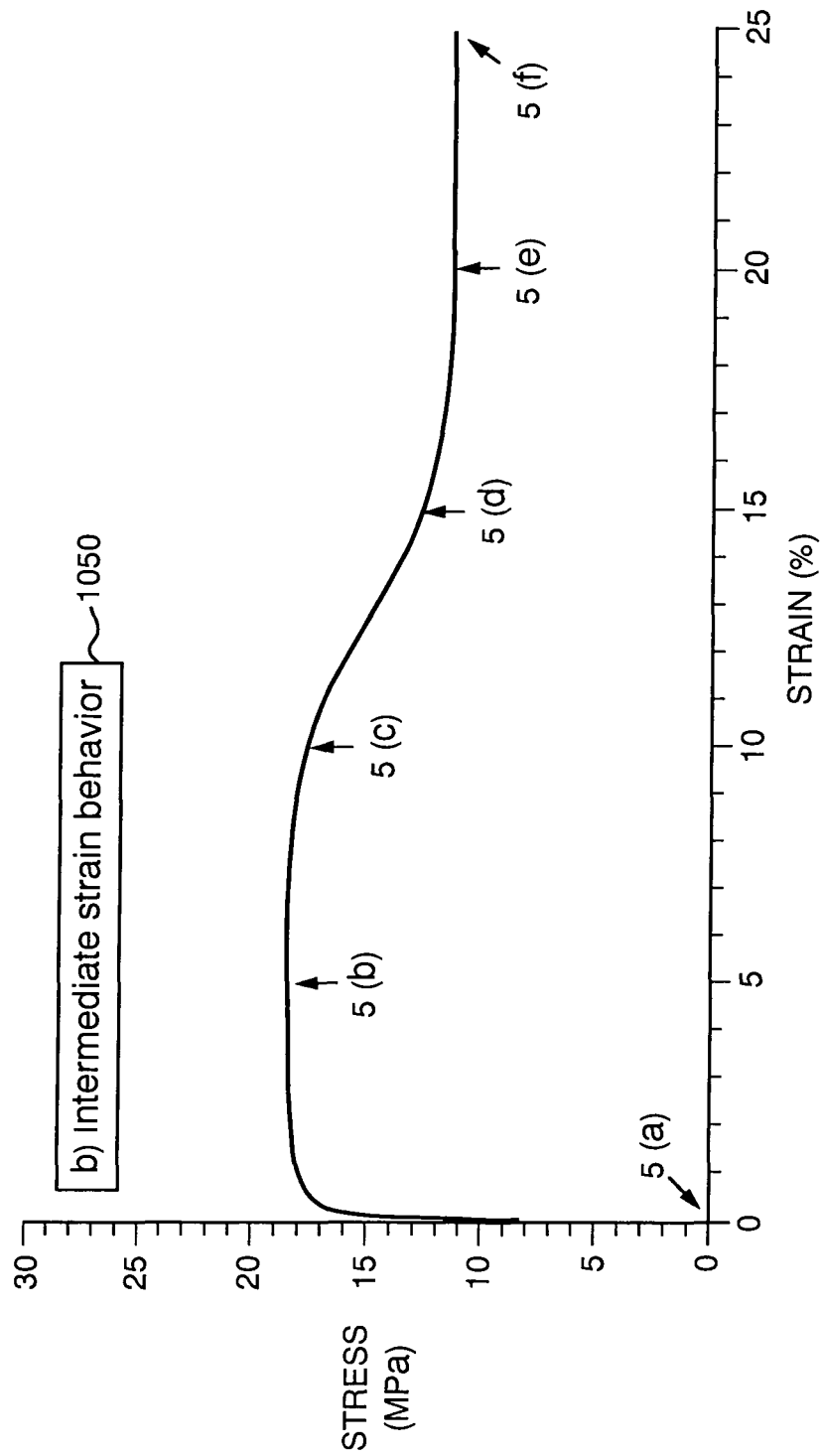

The compressive stress-strain behavior for the 17% dense (8-mesh) laminate is shown in FIGS. 10A-10B. Referring to the low strain behavior graph 1002 of FIG. 10A, during initial loading, a linear elastic behavior with a Young's modulus of E~(i.e., approximately equal to) 15 GPa was recorded. At a strain of $\epsilon$~0.04%, the linear elastic behavior ceased and a region of rapidly decreasing slope ensued. A distinct plateau then appeared which continued until $\epsilon$~7%. The compressive strength was $\sigma_c=18$ MPa. After $\epsilon$~7%, the slope of the stress-strain curve decreased (becoming negative) with a corresponding reduction in load carry capacity. At $\epsilon$~17%, another plateau was formed. The stress in this second (lower) plateau was 12 MPa.

Turning to FIG. 10B, the intermediate strain behavior graph 1050, delamination of the 17% dense (8-mesh) laminae was observed near the left sample edge as early as $\epsilon$~1%. This was caused by high local stress at the joints owing to sample barreling. Some audible acoustic emissions were noted during this period and periodically throughout the test. This delamination, another near the right edge of the sample, and some bending of the debonded laminae are clearly discerned by the time the sample has been strained 5%, FIG. 13B. Delaminations were aggravated by incomplete bonding of laminae. Differences in the amount of bending experienced by warp and weft wires during weaving resulted in at least half of all possible interlaminae contacts having a gap between them (See for example FIG. 3B). Creating this second set of bonds is likely to result in a triangular (rather than diamond-like) pore structure and improved resistance to delamination through the thickness. At $\epsilon$~7%, one textile layer at the center of the sample began to bend and collapse (in the out-of-plane direction). By $\epsilon$~10%, collapse of most of the remaining cells in that cross-sectional plane had begun, FIG. 13C. The dark region just below the sample center was a consequence of movement by these collapsed cells in the out-of-plane direction (toward the extensometer). As loading continued, this region extended vertically, FIG. 13D. This deformation banding of cells led to a decreased load carry capacity and the second (lower) plateau dominated by mircotruss bending and collapse (rather than compressive yielding). The diamond-like pores spread apart during the crushing. A triangulated architecture is likely to resist the spreading and increase of the crushing stress.

For the 31% dense (16-mesh) laminate, Young's modulus was E~33 GPa and its compressive strength was $\sigma=41$ MPa. After initial yielding, a distinct plateau was not observed.

Rather, the stress continued rising to a maximum of 61 MPa at $\epsilon$~5%. Numerous delaminations accompanied a continued reduction of load carry capacity with increasing strain. Delamination frequency and severity were much greater for this more dense laminate owing to its reduced compliance and the higher point stresses (bonds now break before wires bend). Bending and collapse of cells was not observed. Rather, entire laminae separated from one another and bent in unison to the bending seen with the outermost laminae of the 17% dense (8-mesh) sample. This test was stopped prematurely due to delaminations.

Using $E_S$=205 GPa for nichrome, the relative Young's moduli for the cellular structures are $E/E_S$=0.073 for the 17% dense laminate and $E/E_S$=0.161 for the 31% dense laminate, which are 14% less and 4% greater, respectively, than the predicted values of 0.085 and 0.155, respectively, from Equation (2). For the 17% dense laminate, the mean of five Vicker's indentation hardness tests at various points away from the bonded joints was $HV_{500}$=171. Ni—Fe—Cr alloys of similar chemistry and hardness have 0.2% offset yield strengths which are typically 200-210 MPa. Thus, with the $\sigma_{ys}$=205 MPa for nichrome, the relative compressive strengths (corresponding to the first plateau region) of the laminates were $\sigma_c/\sigma_{ys}$=0.088 and 0.200, which are 4% and 29% greater than the (0.085 and 0.155) predictions of Equation (3).

Figure 11A:
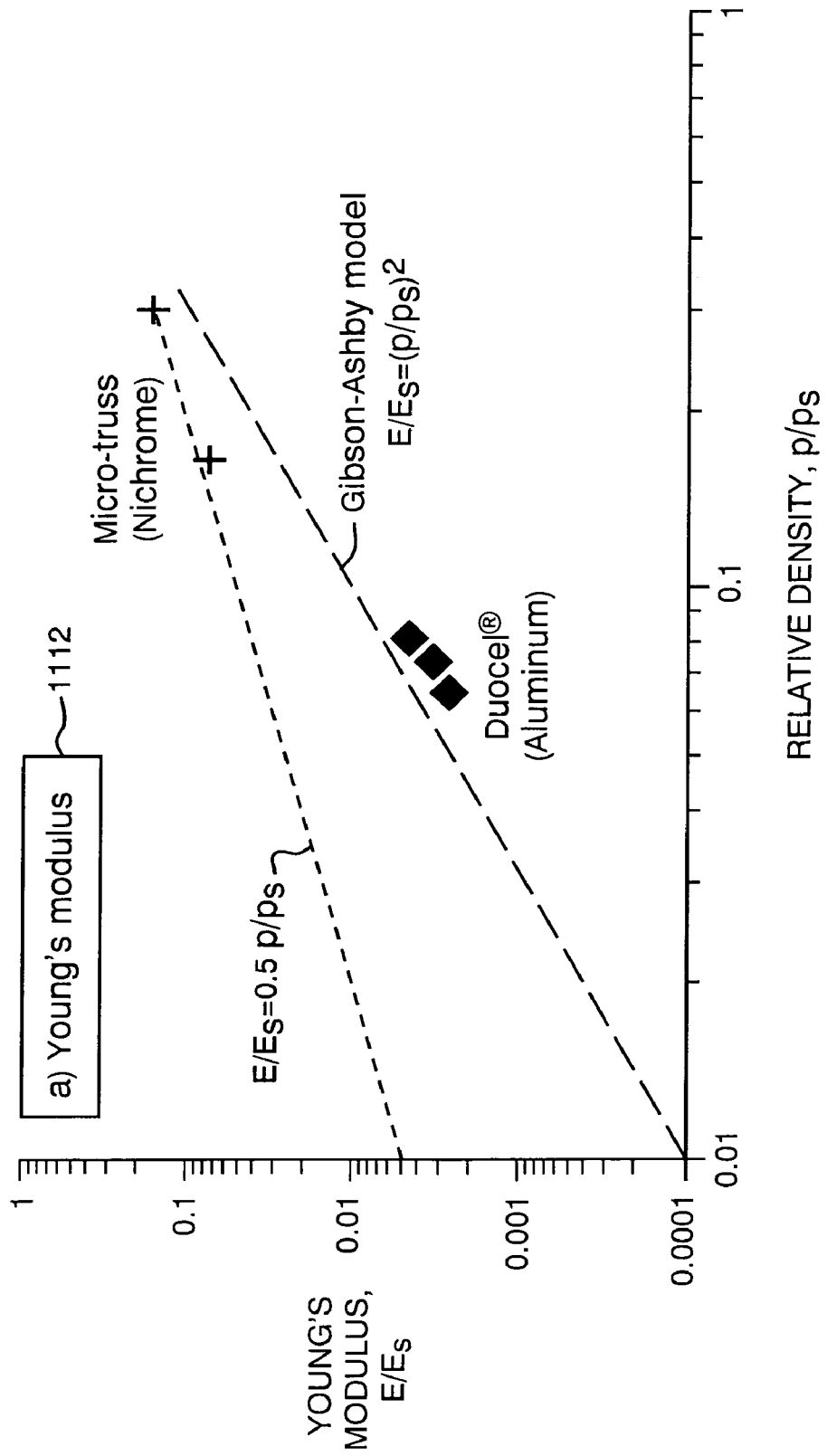
FIGS. 11A-11B show the graphical representation of the relative property data for relative Young's modulus and for relative compressive strength, respectively.
Figure 11B:
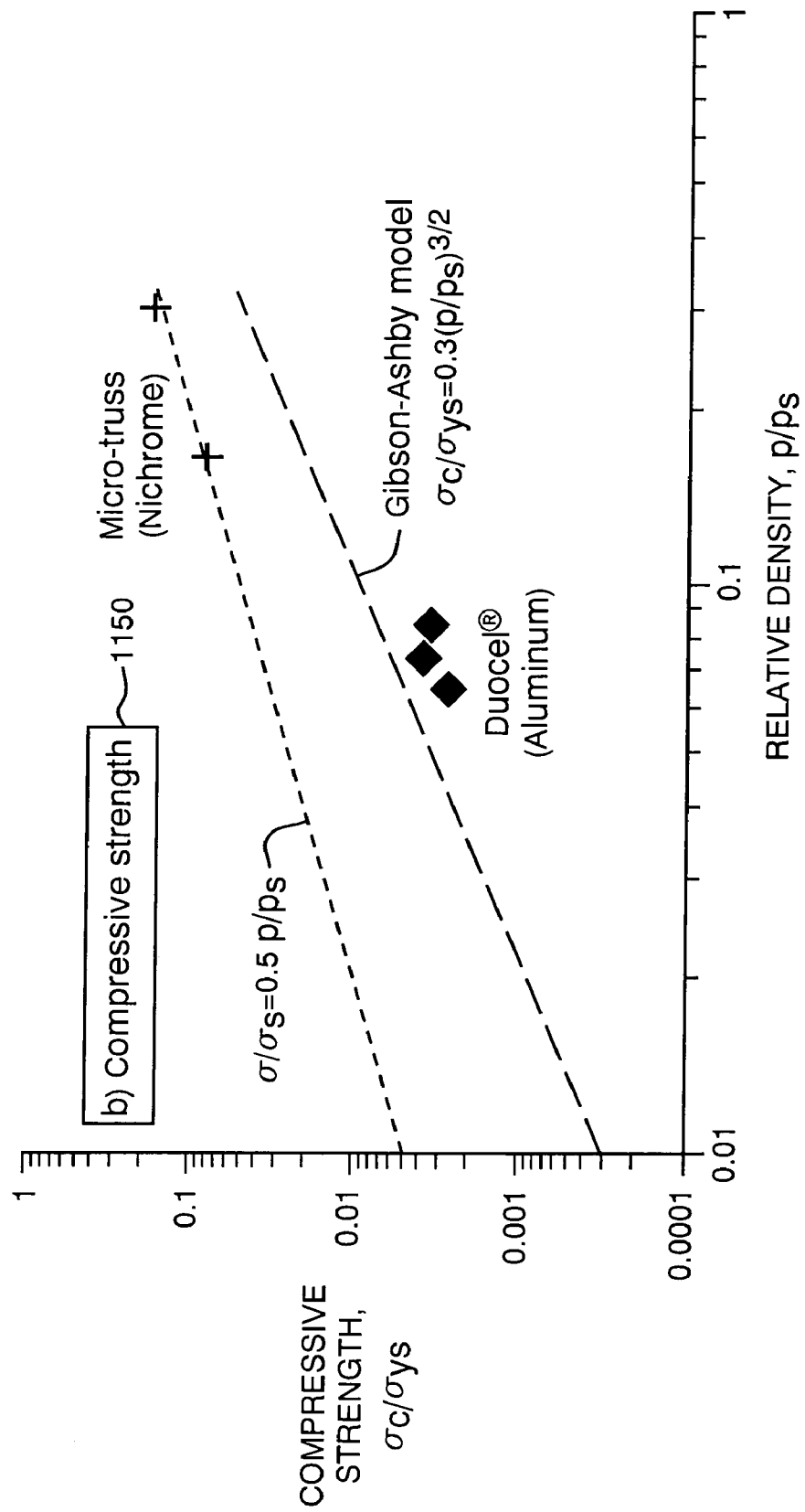

The relative property data are plotted in the graphs in FIGS. 11A-11B., showing data for relative Young's modulus 1112 and for relative compressive strength 1150, respectively, along with representative values for DUOCEL aluminum (6101-T6) foam, the Gibson-Ashby model predictions for stochastic open cell foams, and the predictions of Equation (4) and Equation (5). The anticipated linear property dependence upon relative density is seen. The relative Young's moduli and compressive strengths of nichrome cellular structures supersede those of stochastic open cell foams due to the reduced bending inherent in the architectural design. By comparison of Equations (1) to (4) and Equations (2) to (5), the modeled Young's moduli and compressive strengths for these materials exceed those of stochastic open cell foams by factors of $0.5(\rho/\rho_s)$ and $(5/3)(\rho/\rho_s)^{1/2}$. For example, at $\rho/\rho_s$=5%, the present cellular solid is 10 times stiffer and 7.5 times stronger than the stochastic open cell foam (provided buckling has not preceded yielding). High transparency metal cloth can be used to achieve these low relative densities. A less costly approach (but with a different cell architecture) involves corrugating a more common cloth (e.g., insect netting) and laminating. We have made stainless steel samples with $\rho/\rho_s$<4% in this fashion.

Figure 12A:
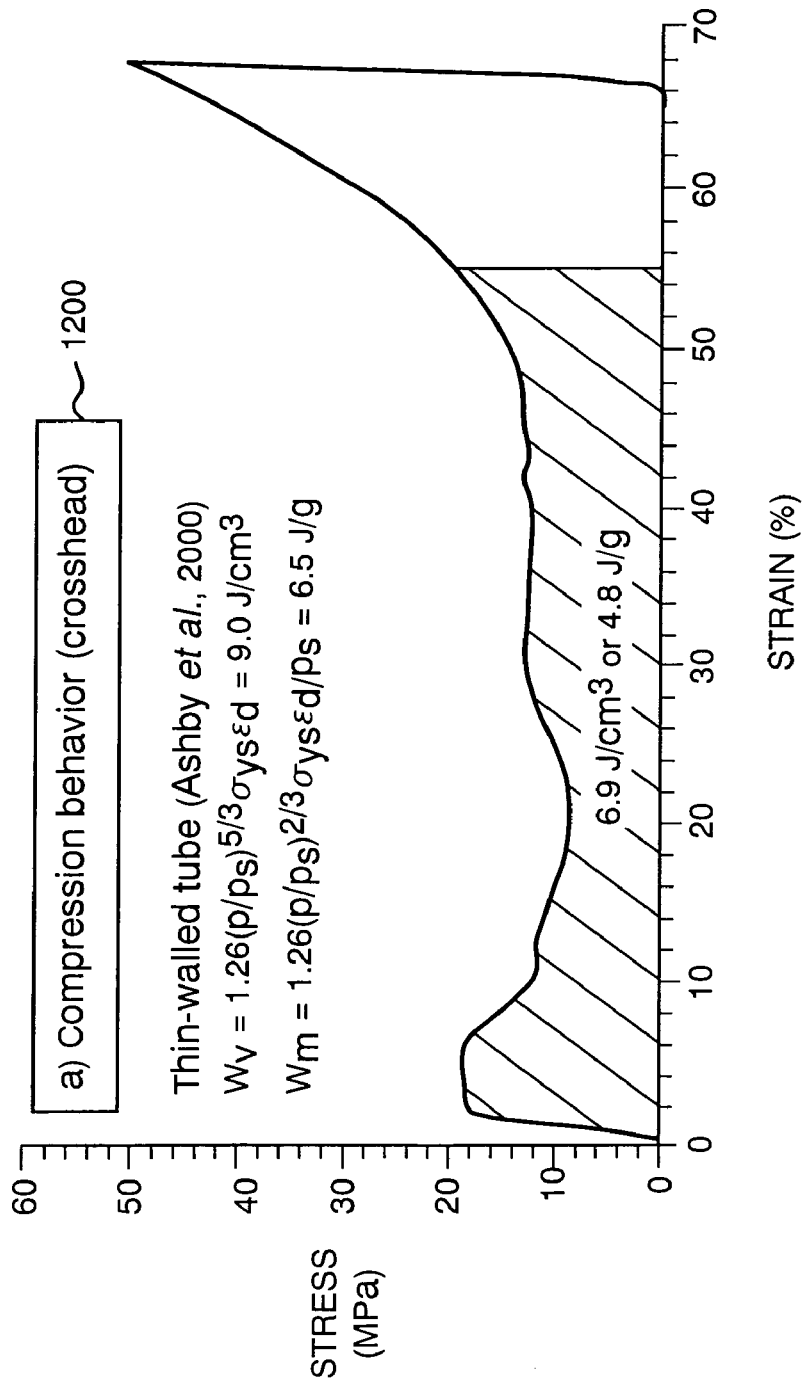
FIG. 12A shows the graphical representation of the compression behavior for 17% dense laminate assessed from the 8-mesh nichrome.
Figure 12B:
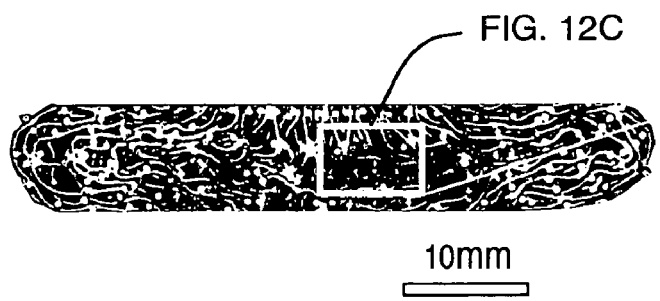
FIG. 12B shows an electron micrograph depiction of the post-test microscopic observations of the joints in a sample from FIG. 12A.
Figure 12C:
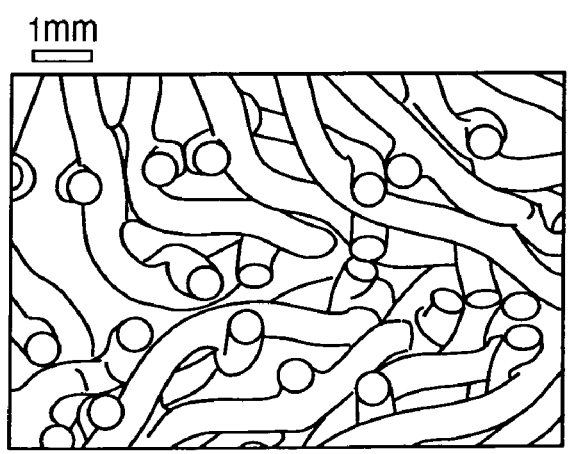
FIG. 12C is an enlarged view of a section of FIG. 12B
Figure 13C:
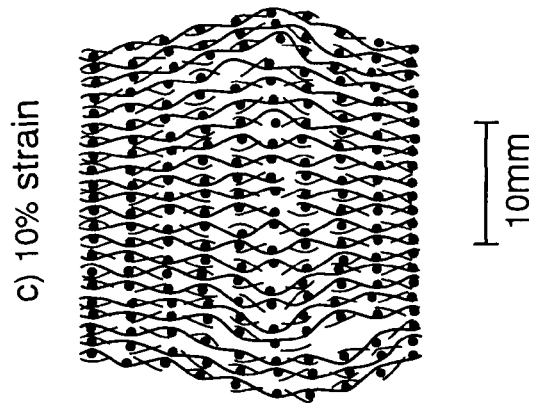
FIGS. 13A-13F show the progressive strain incurred from the damage during compressive loading.
Figure 13B:
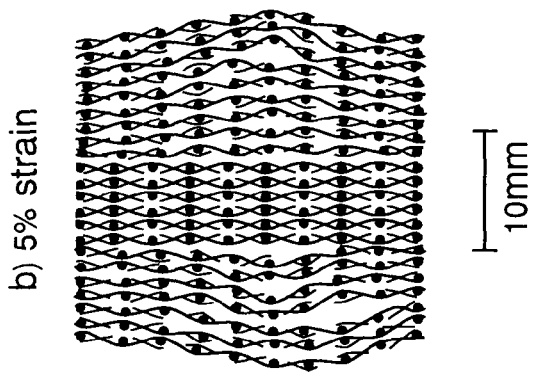
Figure 13A:
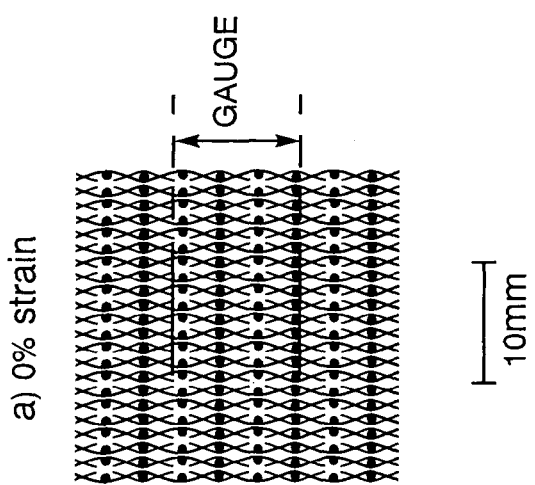
Figures 13D, 13E, 13F:
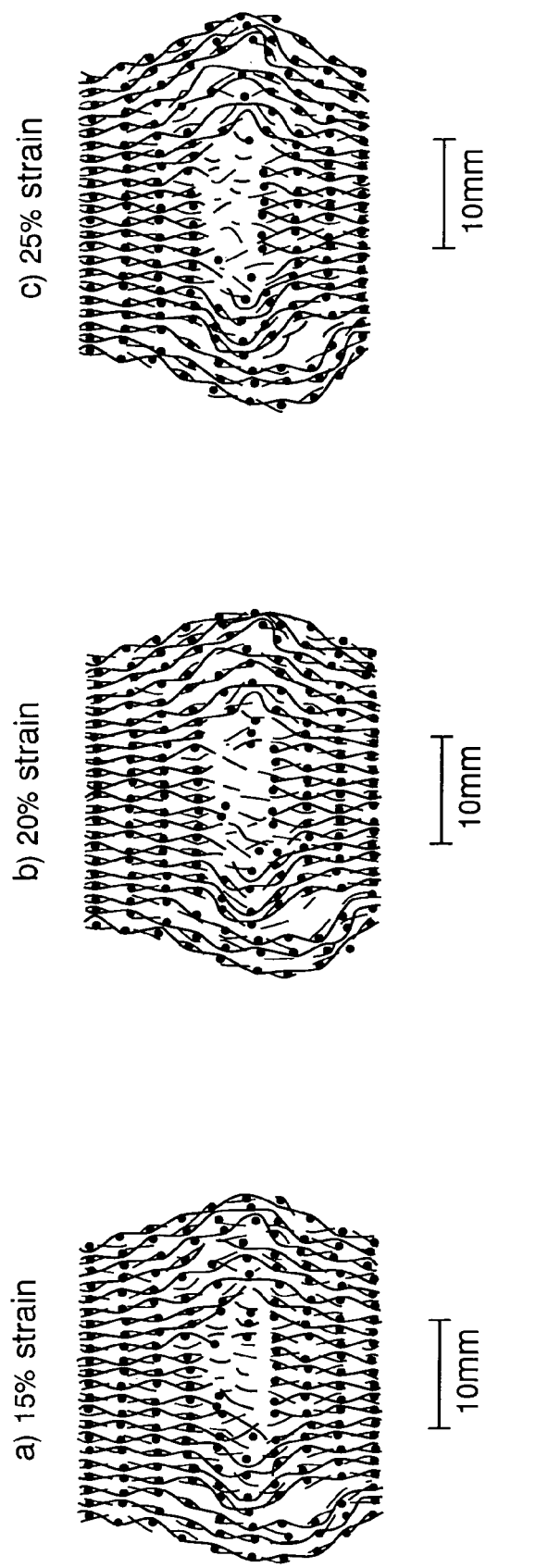

The crushing behavior and energy absorptive capacity for the 17% dense laminate can be assessed from the 8-mesh nichrome high strain compression behavior graph 1200 in FIG. 12A. Several undulations in the stress level (due to micro-truss collapse) are seen with increasing strain until densification (and work-hardening) at 55% strain. A larger sample size (i.e., more cells) smoothens the crushing behavior. Post-test microscopic observations of the joints revealed slight amounts of cracking confined to the joint areas, as shown in FIGS. 12B-12C. A longer hold time at the brazing temperature can be used for further joint homogenization and toughening. Nonetheless, the bonds were able to accommodate large amounts of micro-truss bending and collapse by test end. Upon densification, the absorbed mechanical energy per unit volume was $W_v$6.9 J/cm$^3$, which corresponds to an absorbed energy per unit mass of $W_m$=4.8 J/g. Substituting previously cited nichrome values and using the measured densification strain (0.55) as a first approximation to the tube compaction strain, we find $W_v^{tube}$=9.0 J/cm$^3$ and $W_m^{tube}$=6.5 J/g from Equations (8) and (9). The cellular laminate has about three-fourths of the energy absorptive capacity of an axially crushed thin-walled tube of the same material and relative density. If one notes that delaminations near the edges of the sample had occurred early on and these laminae were not plastically deformed (worked) to their full potential by test end, the possibility for additional energy absorption exists. This structural configuration has excellent energy management potential at a low relative density.

Example 4

Multfunctional Cellular Heat Exchanger (Copper)

Figure 14B:
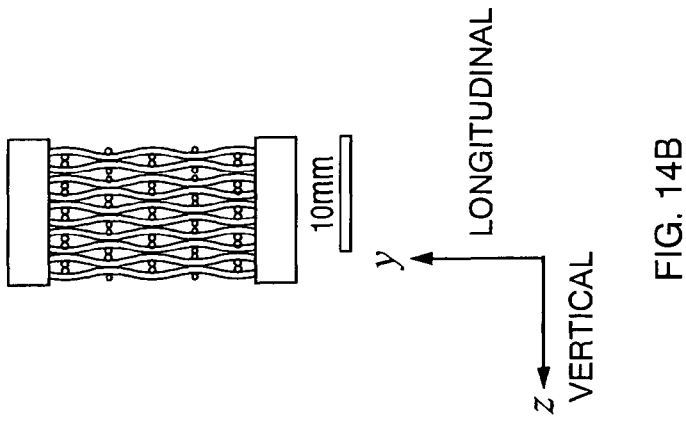
FIGS. 14A-14B show a micrographic depiction of a front and side view, respectively, of a specific embodiment of a multiple layer structural panel sandwich wherein one or more of the face sheets can be disposed on the longitudinal ends.
Figure 14A:
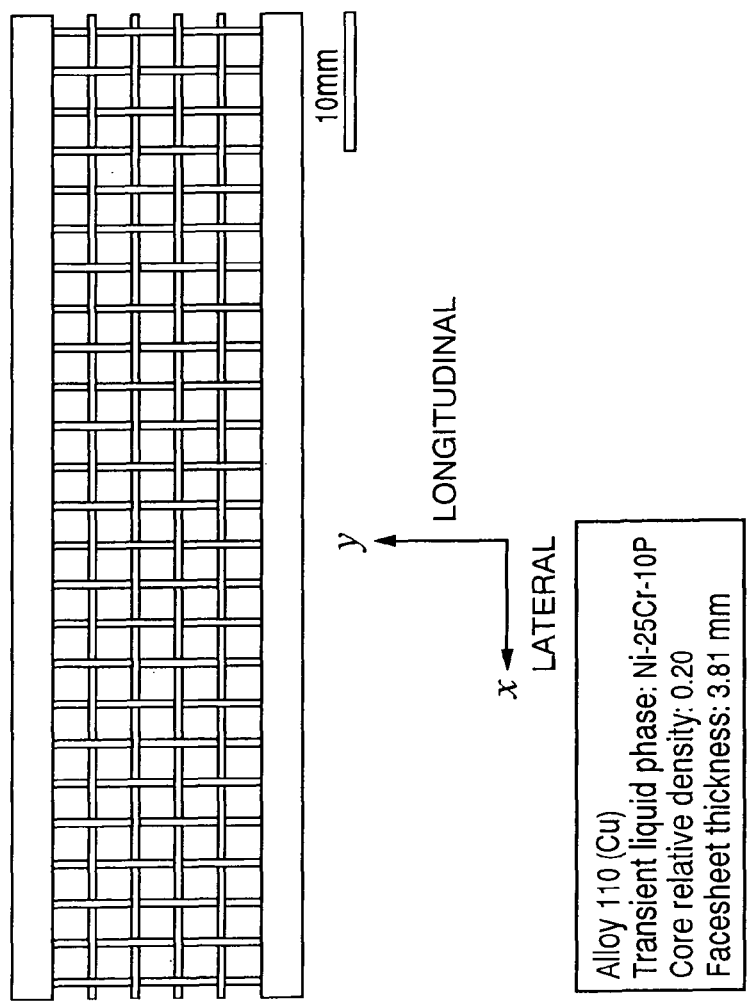

FIGS. 14A and 14B show a front and side view micrographic depiction, respectively, of a specific embodiment of a multiple layer structural panel sandwich wherein one or more of the face sheets can be disposed on the longitudinal ends/perimeter sides of the warp structural members (similarly shown if FIG. 8). This heat exchanger embodiment serves an efficient multifunctional heat exchange, therefore providing: a highly conductive open cell structure of large accessible surface area; a cellular core that efficiently supports loads; and good oxidation and corrosion resistance properties, and hard surface for long wear.

Example 5

Mulfunctional Cellular Structure

Figure 15A:
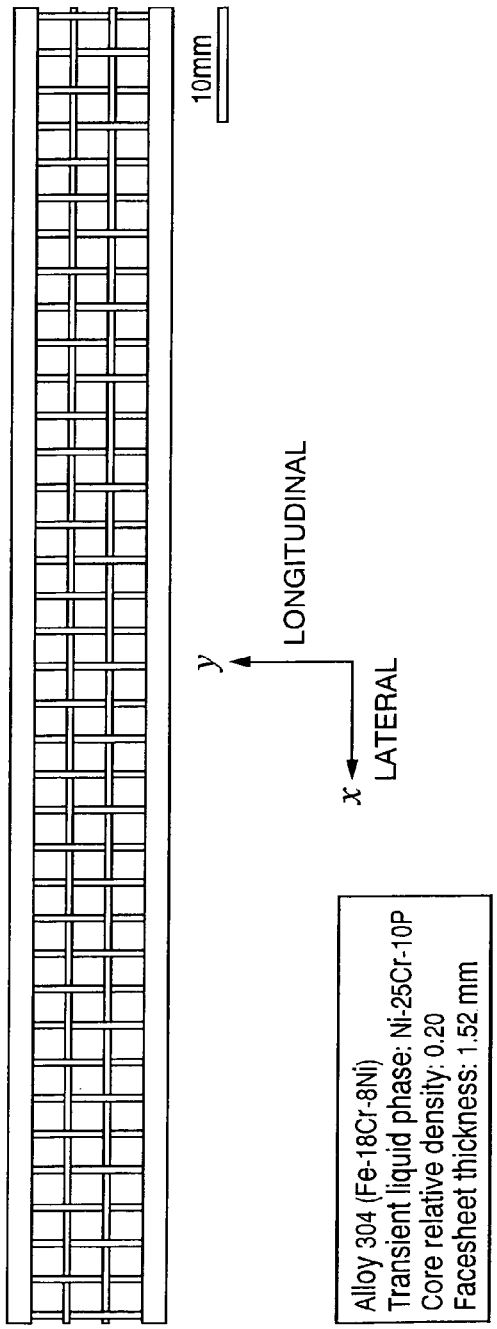
FIGS. 15A-15B show a micrographic depiction of a front and side view, respectively, of a specific embodiment of a multiple layer structural panel sandwich wherein one or more of the face sheets can be disposed on the longitudinal ends.
Figure 15B:
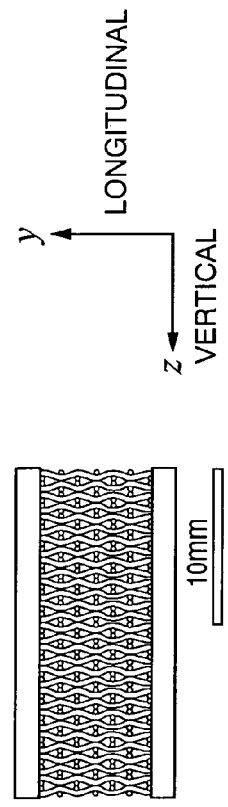

FIGS. 15A and 15B show a front and side view micrographic depiction, respectively, of a specific embodiment of a multiple layer structural laminate comprised of stainless steel.

Example 6

Multfunctional Cellular Structures

Figure 16A:
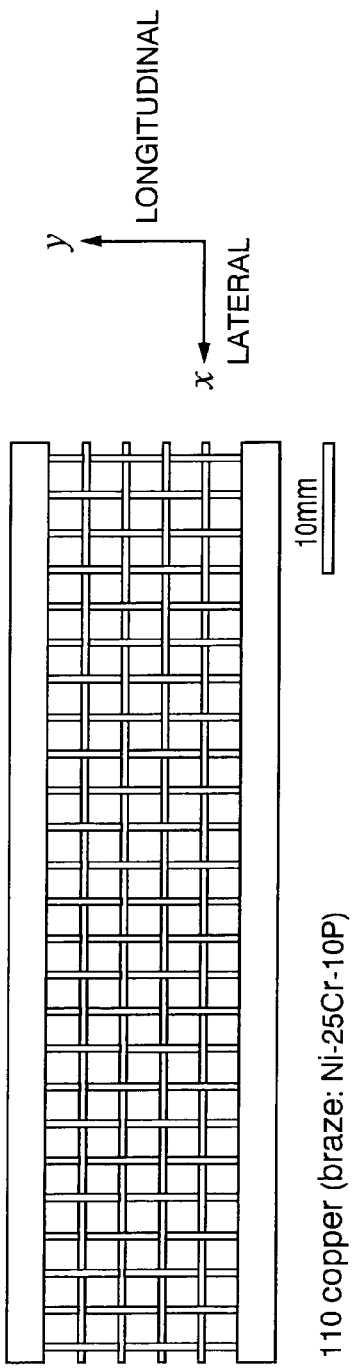
FIGS. 16A-16D show front view micrographic depictions of specific material embodiments of multiple layer laminate structures.
Figure 16B:
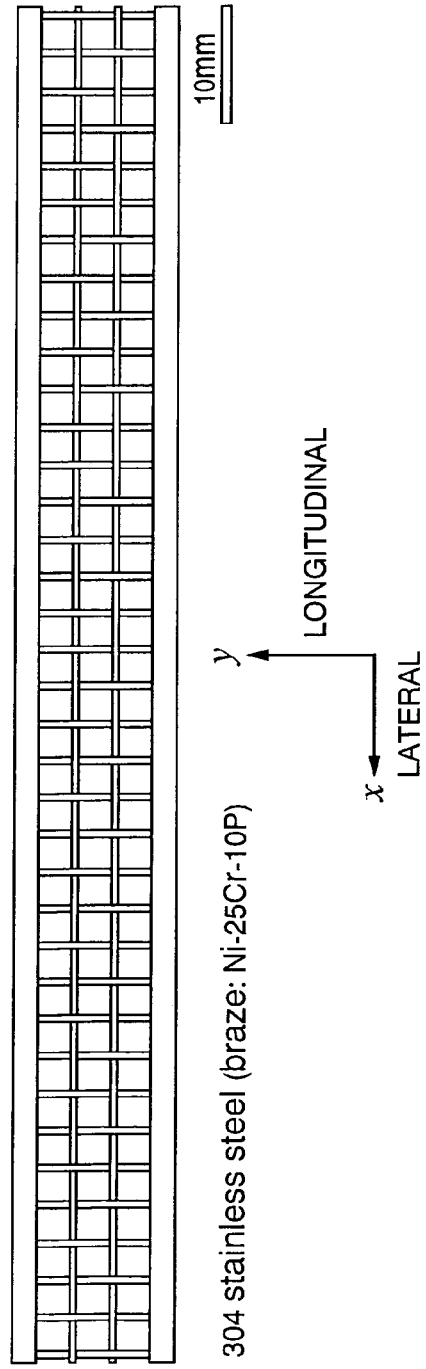
Figure 16D:
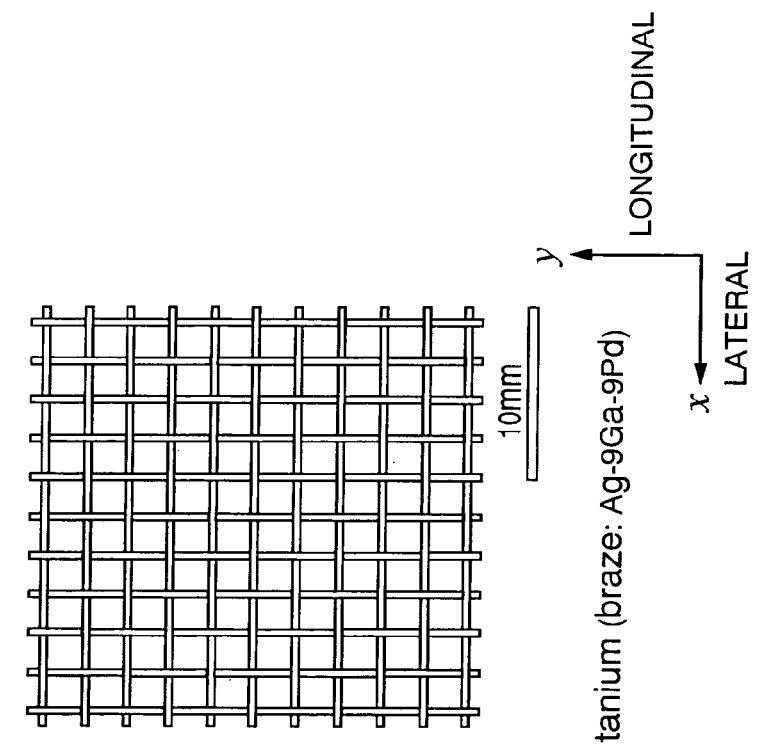
Figure 16C:
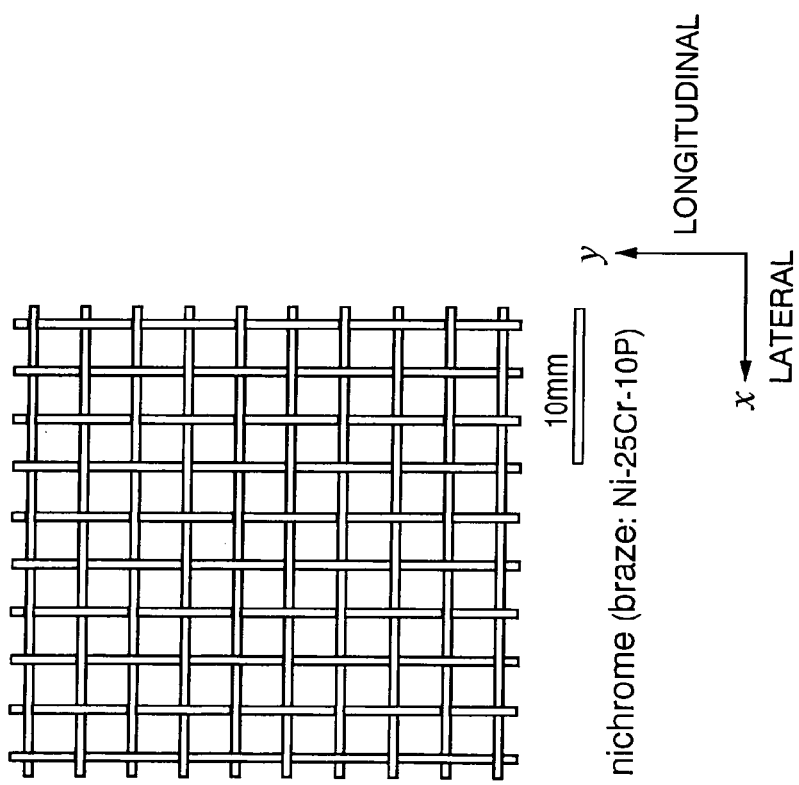

FIGS. 16A-16D show front view micrographic depictions of specific material embodiments of multiple layer laminate structures, wherein FIGS. 16A and 16B further provide a sandwich panel construction.

Example 7

Laminae Corrugation

Figure 17:
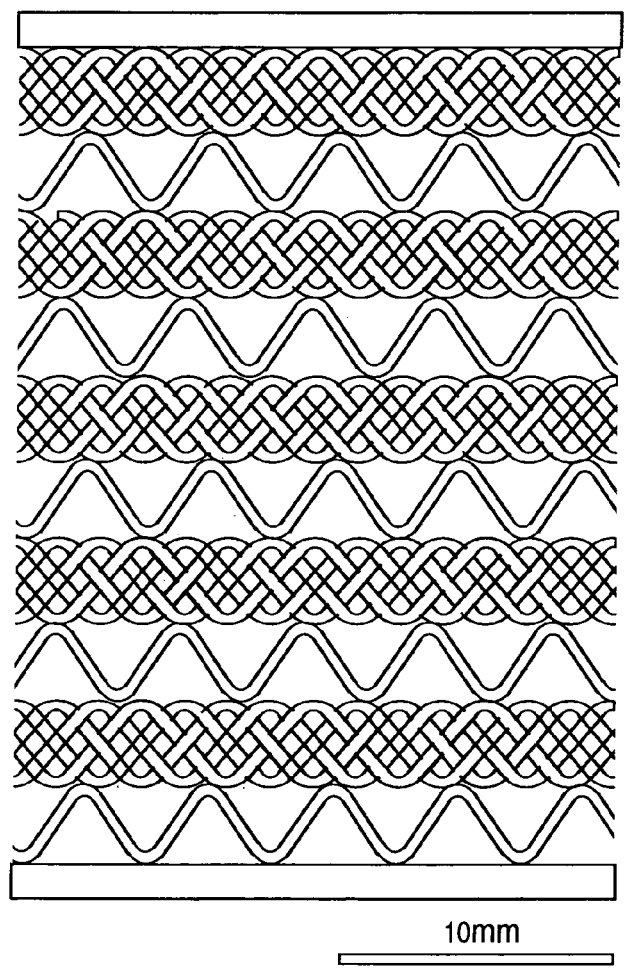
FIG. 17 shows a side view micrographic depiction of corrugated structural panel sandwich design.

FIG. 17 shows a side view micrographic depiction of corrugated structural panel sandwich design. In particular, a stack of corrugated wire mesh or screens are vertically stacked in a criss-cross 0° to 90° arrangement (and alternatively can cross at a variety of angles ranging from 0° to about 90°). Various types and quantities of textile layers can be interspersed or arranged in addition to the instant illustration.

In summary, the present invention provides open cell periodic metal truss structures, and methods for their manufacture, that can exhibit significantly higher stiffness and strengths than stochastic cellular metal structures of the same relative density while still providing high mechanical energy absorption and efficient heat exchange opportunities.

Moreover, in accordance with the present teachings, the invention can relate to materials and to methods for producing materials which materials are preferably laminate cellular solids comprised of two or more layers bonded together. Finally, as will be appreciated by the skilled practitioner, the invention can be used, for example, in applications where multifunctional load supporting cellular structures are required which can provide mechanical impact/blast absorption, thermal management, noise attenuation, catalyst support, filtration, electrical energy storage, retardation of chemical reactions and/or fire, or act as a host for the in-growth of biological tissue.

The invention may be embodied in other specific forms without departing from the spirit or essential characteristics thereof. Of course, it should be understood that a wide range of changes and modifications can be made to the preferred embodiment described above. The foregoing embodiments are therefore to be considered in all respects illustrative rather than limiting of the invention described herein. Scope of the invention is thus indicated by the appended claims as read in light of the foregoing description, including all equivalents, and all changes which come within the meaning and range of equivalency of the claims are therefore intended to be embraced herein.

We claim

1. A cellular structure comprising:
 a plurality of vertically stacked textile layers, wherein at least N number (N>1) of each of said stacked textile layers comprise:
 an array of intersecting structural support members forming apertures of predetermined geometric configurations, wherein each of said predetermined geometric apertures are vertically aligned with respective apertures of corresponding immediate adjacent textile layers;
 said textile layers having a top side and a bottom side;
 said textile layers having a perimeter with at least three perimeter sides; wherein:
 at least a portion of said top side of each of said textile layers for the first through ($N^{th}-1$) layers comprise a top adjoining region;
 at least a portion of said bottom side of each of said textile layers for the second through ($N^{th}$) layers comprise a bottom adjoining region; and
 wherein each of said textile layers are discretely bonded at selected points of contact to immediate adjacent textile layers, wherein said discrete bonds are formed:
 between said top adjoining region and said bottom adjoining region, and
 using a material distinct from materials used to make said immediate adjacent textile layers.

2. The cellular structure of claim 1, wherein said structural support members are tubular filaments.

3. The cellular structure of claim 1, wherein said structural support members are wire filaments.

4. The cellular structure of claim 1, wherein said structural support members are made of a woven material.

5. The cellular structure of claim 1, wherein at least some of said textile layers are a woven mesh.

6. The cellular structure of claim 1, wherein at least some of said textile layers are a square woven mesh.

7. The cellular structure of claim 1, wherein at least some of said textile layers are a knitted mesh.

8. The cellular structure of claim 1, wherein at least some of said textile layers are a braided mesh.

9. The cellular structure of claim 1, wherein at least some of said textile layers are a triaxial mesh.

10. The cellular structure of claim 1, wherein at least some of said textile layers are a biaxial mesh.

11. The cellular structure of claim 1, wherein at least some of said textile layers are a quasi-triaxial mesh.

12. The cellular structure of claim 1, wherein at least some of said textile layers are three-dimensional elements.

13. The cellular structure of claim 12, wherein at least some of said three-dimensional textile layers are a structure made from the group consisting of braided, multi-ply, triaxial, multi-axial, H-beam, I-beam, and honeycomb.

14. The cellular structure of any one of claims 1-13, wherein the structural support members are made from a material selected from the group consisting of Fe, Ni, Cr, Ga, Pd, Ag, P, Al, Cu, Ti, Ta, Mo, Ag, Pt, Mg, and Be.

15. The cellular structure of any one of claims 1-13, wherein the structural support members are made from composites formed of one or more of a material selected from the group consisting of Fe, Ni, Cr, Ga, Pd, Ag, P, Al, Cu, Ti, Ta, Mo, Ag, Pt, Mg, and Be.

16. The cellular structure of any one of claims 1-13, wherein the structural support members are made from a material selected from the group consisting of metal, alloy, ceramic, polymer, and semiconductor.

17. The cellular structure of claim 1, further comprising:
 a first perimeter-oriented face sheet having an inner surface and an outer surface, wherein said inner surface is fixedly bonded to one of said perimeter sides of at least a minority of each of said textile layers; and
 a second perimeter-oriented face sheet having an inner surface and an outer surface, wherein said inner surface is fixedly bonded to a second one of said perimeter sides of at least a minority of each of said textile layers.

18. The cellular structure of claim 1, further comprising:
 a first layer-oriented face sheet having an inner surface and an outer surface, wherein said inner surface is fixedly bonded to at least a portion of said bottom side of first said textile layer; and
 a second layer-oriented face sheet having an inner surface and an outer surface, wherein said inner surface is fixedly bonded to at least a portion of said top side of $N^{th}$ said textile layer.

19. The cellular structure of claim 1, wherein at least some of said structural support members are tubes.

20. The cellular structure of claim 19, wherein at least some of said tubes are hollow or solid.

21. The cellular structure of claim 1, wherein at least some of said structural support members are wires.

22. The cellular structure of claim 21, wherein at least some of said wires are hollow or solid.

23. A method of making a cellular structure comprising a plurality of textile layers, wherein at least N number (N>1) each of said textile layers comprise an array of intersecting structural support members forming apertures of pre-determined geometric configurations, wherein said textile layers have a top side and a bottom side; wherein said textile layers having a perimeter with at least three perimeter sides; wherein at least a portion of said top side of each of said textile layers for the first through ($N^{th}-1$) layers comprise a top adjoining region;
 wherein at least a portion of said bottom side of each of said textile layers for the second through ($N^{th}$) layers comprise a bottom adjoining region; said method comprising:
 aligning said textile layers wherein each of said predetermined geometric apertures are vertically aligned with respective apertures of corresponding immediate adjacent said textile layers,
 contacting each of said textile layers with immediate adjacent textile layers at respective top adjoining regions and bottom adjoining regions;

joining each of said contacted textile layers by forming a discrete bond at selected areas of contact, and using a material distinct from materials used to make said contacted textile layers.

24. The method of claim 23, further comprising:
providing a first perimeter-oriented face sheet having an inner surface and an outer surface;
bonding said inner surface of said first face sheet to one of said perimeter sides of at least a minority of each of said textile layers;
providing a second perimeter-oriented face sheet having an inner surface and an outer surface; and
bonding said inner surface of said second face sheet to a second one of said perimeter sides of at least a minority of each of said textile layers.

25. The method of claim 23, further comprising:
providing a first layer-oriented face sheet having an inner surface and an outer surface;
bonding said inner surface of said first face sheet to at least a portion of said bottom side of first said textile layer;
providing a second layer-oriented face sheet having an inner surface and an outer surface; and
bonding said inner surface of said second face sheet to at least a portion of said top side of $N^{th}$ said textile layer.

26. The method of claim 23, wherein at least some of said structural support members are tubes.

27. The method of claim 26, wherein at least some of said tubes are hollow or solid.

28. The method of claim 23, wherein at least some of said structural support members are wires.

29. The method of claim 28, wherein at least some of said wires are hollow or solid.

* * * * *